(12) United States Patent
Kajitani

(10) Patent No.: US 6,421,691 B1
(45) Date of Patent: Jul. 16, 2002

(54) DOCUMENT MANAGEMENT APPARATUS AND METHOD, A RECORDING MEDIUM STORING A DOCUMENT MANAGEMENT PROGRAM, AND A RECORDING MEDIUM STORING A DECISION-MAKING PROGRAM

(75) Inventor: Tadahiro Kajitani, Ishikawa (JP)

(73) Assignee: Mitani Sangyo Co., Ltd. (JP)

( * ) Notice: Subject to any disclaimer, the term of this patent is extended or adjusted under 35 U.S.C. 154(b) by 0 days.

(21) Appl. No.: 09/263,675

(22) Filed: Mar. 5, 1999

(30) Foreign Application Priority Data

| Mar. 6, 1998 | (JP) | ............................................. 10-055519 |
| Feb. 25, 1999 | (JP) | ............................................. 11-047975 |

(51) Int. Cl.$^7$ .......................... G06F 15/00; G06F 17/00; G06F 17/21
(52) U.S. Cl. ......................................... 707/500; 706/61
(58) Field of Search ............................ 706/61; 707/500, 707/526; 345/595

(56) References Cited

U.S. PATENT DOCUMENTS

| 5,120,944 A | * | 6/1992 | Kern et al. .................. 235/379 |
| 5,191,525 A | * | 3/1993 | LeBurn et al. ............... 707/500 |
| 5,221,830 A | * | 6/1993 | Kern .............................. 705/30 |
| 5,335,296 A | * | 8/1994 | Larkin et al. ................ 382/298 |
| 5,708,810 A | * | 1/1998 | Kern et al. .................... 717/11 |
| 5,874,171 A | * | 2/1999 | Kern et al. .................. 235/379 |
| 5,893,095 A | * | 4/1999 | Jain et al. ........................ 707/6 |
| 5,911,139 A | * | 6/1999 | Jain et al. ........................ 707/3 |
| 5,913,205 A | * | 6/1999 | Jain et al. ........................ 707/2 |
| 5,915,250 A | * | 6/1999 | Jain et al. .................... 707/100 |
| 5,999,911 A | * | 12/1999 | Berg et al. ..................... 705/9 |
| 6,006,242 A | * | 12/1999 | Poole et al. ................. 707/531 |
| 6,192,381 B1 | * | 2/2001 | Stiegemeier et al. ........ 707/505 |

OTHER PUBLICATIONS

Siau et al.; "Evaluation of Information Modeling Methods—A Review". Proceedings of the Thirty–First hawaii International Conference on System Sciences, 1998, Jan. 1998, vol. 5, pp. 314–322.*

Ellison, P.; "Introduction to SGML concepts". IEE Colloquium on Adding Value to Documents with Markup Languages, Aug. 1994, pp. 1/1–1/5.*

(List continued on next page.)

*Primary Examiner*—Kakali Chaki
*Assistant Examiner*—Kelvin Booker
(74) *Attorney, Agent, or Firm*—Baker & Daniels

(57) ABSTRACT

The invention provides a document management apparatus and method and a recording medium storing a document management program, which can display documents under management without the user having to be conscious of the data structure of the documents generated during the course of transactions. The invention also provides a recording medium storing a decision making program which can display application documents under management without the user having to be conscious of the data structure of the application documents generated during the course of decision making transactions. The document management apparatus comprises: a management information generating means 1 for generating management information used to manage a plurality of documents; a storage means 2 for relating the plurality of documents with the management information generated by the management information generating means 1 and storing the related documents and management information; and a display control means 3 for making a display, based on the management information stored in the storage means 2, to allow selection of one of the documents, and for displaying the selected document in a display format as defined by the instruction data contained in that document.

14 Claims, 14 Drawing Sheets

OTHER PUBLICATIONS

Roberts, S.; "Modeling and Simulation with Insight". Proceedings of the 1986 conference on Winter simulation, Dec. 1986, pp. 104–112.*

Tang et al.; "Document processing for automatic knowledge acquisition". IEEE Transactions on Knowledge and Data Engineering, Feb. 1994, vol. 6, Iss. 1, pp. 3–21.*

Tang et al.; "Financial Document Processing based on Staff Line and Description Language". IEEE Transactions on Systems, Man and Cybernetics, May 1995, vol. 25, Iss. 5, pp. 738–754.*

Sharman et al.; "Self Service Document Processing for Banking Automation". IEE colloquium on Document Image Processing and Multimedia Environments, Aug. 1995, pp. 8/1–8/5.*

Yu et al.; "A Generic System for Form Dropout". IEEE Transactions on Pattern Analysis and Machine Intelligence, Nov. 1996, vol. 18, Iss. 11, pp. 1127–1134.*

* cited by examiner

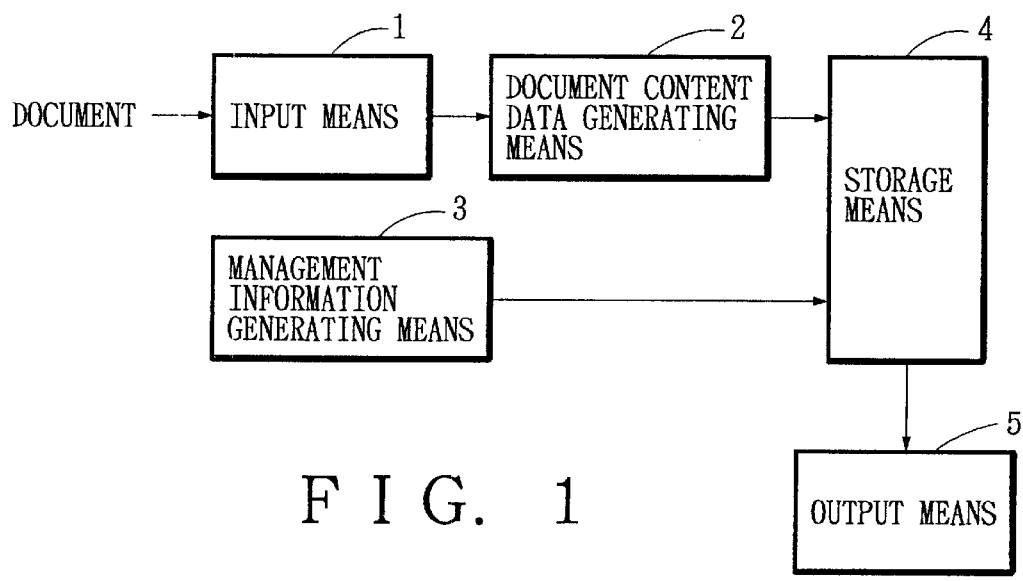
F I G. 1
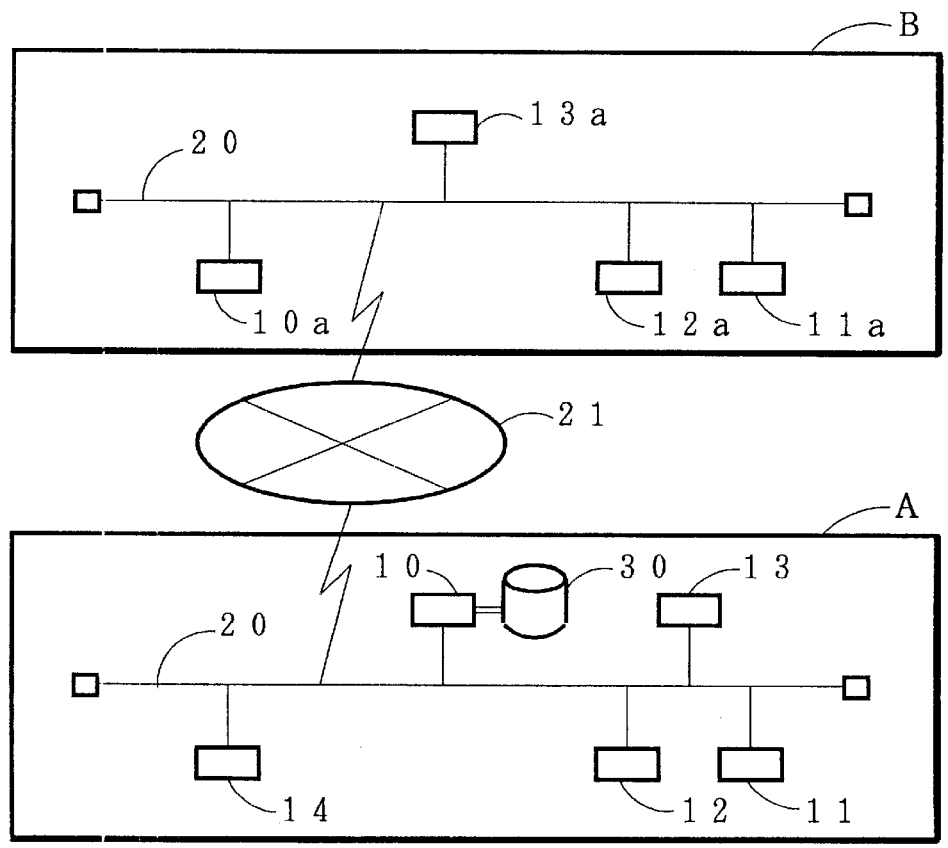
F I G. 2

| C1 : DEPARTMENT NUMBER |
| C2 : DRAFT PLAN NUMBER |
| C3 : STAFF NUMBER |
| C4 : APPLICATION DATE |
| C5 : APPLICATION CATEGORY |
| C6 : PRIORITY LEVEL |
| C7 : PRIOR CONSULTATION INFORMATION |
| C8 : DECISION ITEM |
| C9 : REFERENCE DATA |
| C10 : DATA OF DECISION |
| C11 : STATE OF DECISION |

| D1 : DEPARTMENT NUMBER |
| D2 : DRAFT PLAN NUMBER |
| D3 : DIVISION NUMBER |
| D4 : APPLICATION DOCUMENT DATA |

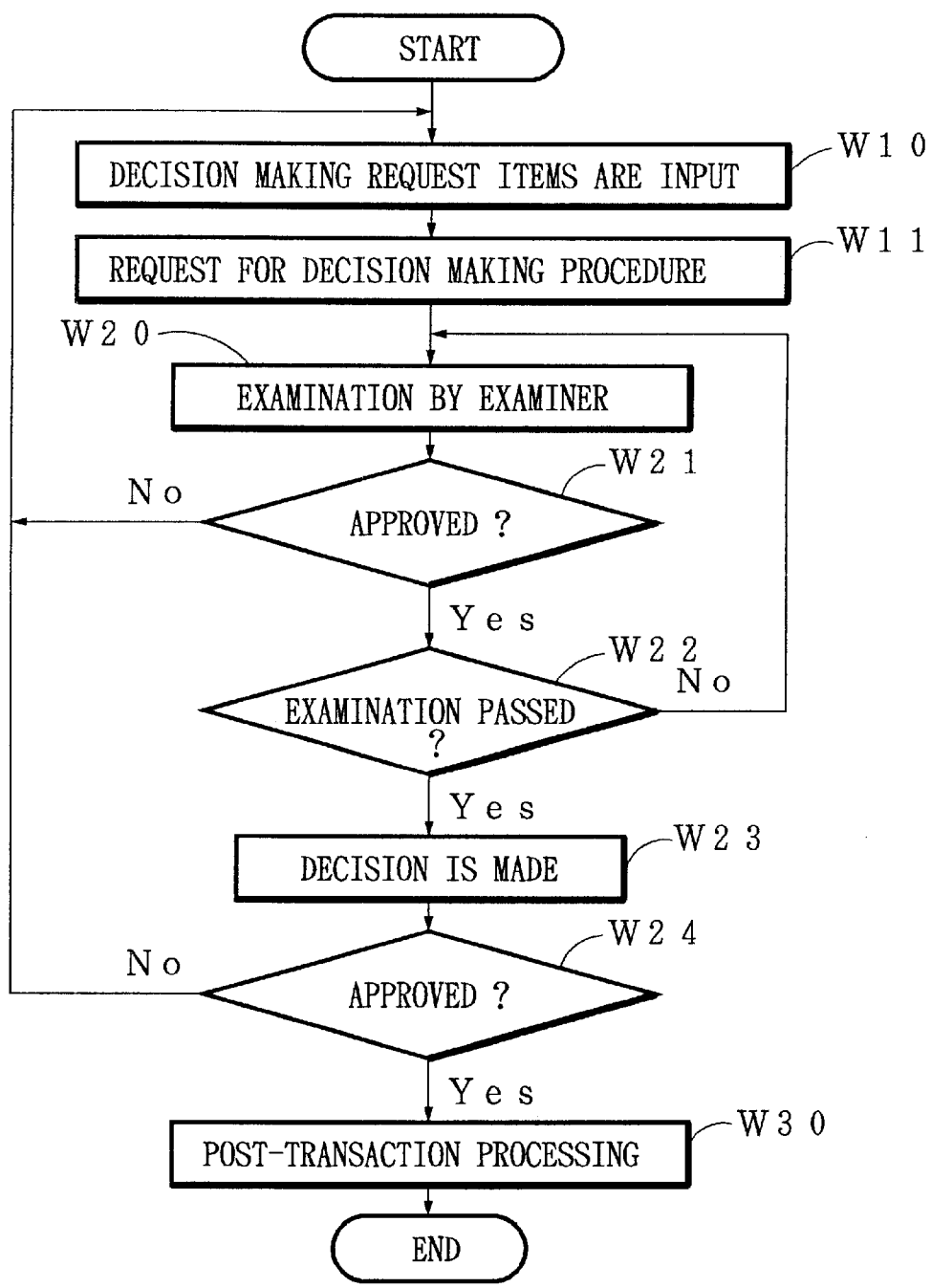
F I G. 6

FIG. 7

| |
|---|
| R10 : DRAFT NUMBER |
| R11 : APPLICATION CATEGORY |
| R20 : PERSONAL INFORMATION |
| R20 : PERSONAL INFORMATION |
| ⋮ |
| R20 : PERSONAL INFORMATION |

FIG. 8A

| |
|---|
| R21 : POSITION INFORMATION |
| R22 : NAME INFORMATION |
| R23 : STAFF NAMBER |
| R24 : DECISION CONTROL LEVEL INFORMATION |
| R25 : TRANSACTION DATA |
| R26 : SUBSTITUTE NUMBER |
| R27 : CONFIRMATION INFORMATION |

FIG. 8B

EXAMINATION/DECISION LIST

PASSWORD: [b1]  —b2

[RETURN] [EXAMINATION/DECISION CONFIRMATION] —b3 [SEND-BACK] —b4 [REJECT] —b5

TO MAKE A DECISION, CLICK ☐ WITH A MOUSE AND PRESS THE DECISION BUTTON —b15

| PRIORITY | CONTROL LEVEL | EXAMINATION/DECISION | APPLICATION CATEGORY | APPLICATION DATE | APPLICANT(MAIL) | REMARKS |
|---|---|---|---|---|---|---|
| ▶ | | | | | | REFERENCE DATA |
| ☐ NORMAL | DECISION | REGARDING: CREDIT LINE ABC CORP. | CREDIT LINE DRAFT PLAN (7 MILLION OR LESS) | 1997/0X/0X | ×× ×× | |
| ☐ NORMAL | EXAMINATION | REGARDING: CREDIT LINE FOR AA CHEMICAL INDUSTRIES | CREDIT LINE DRAFT PLAN (25 MILLION OR LESS) | 1997/0X/0X | △△ △△ | |
| ☐ NORMAL | EXAMINATION | NEW SUPPLIER DRAFT PLAN FOR BB CORP. | NEW SUPPLIER DRAFT PLAN | 1997/0X/0X | ○○ ○○ | |
| ☐ NORMAL | EXAMINATION | NEW SUPPLIER DRAFT PLAN FOR CC CORP. | NEW SUPPLIER DRAFT PLAN | 1997/0X/0X | ☐☐ ☐☐ | | b12, b11, b13, b14, b10 — b16, b17, b18

COMMENT ON DRAFT CONTENT (c2)

PASSWORD (c1)

EXAMINATION/DECISION CONFIRMATION (c3) | SEND-BACK (c4) | REJECT (c5) | ADD COMMENT | CLEAR (c7) | RETURN (c8)
(c6)

*TO DELETE COMMENT, FIRST ERASE THA COMMENT AND THEN PRESS THE ADD COMMENT BUTTON.

CREDIT LINE DRAFT PLAN (FOR REFERENCE)

| FURIGANA | イーピーシーョウカイ | ADDRESS OF HEAD OFFICE | 3-3-3, SHINJUKU, TOKYO | | |
|---|---|---|---|---|---|
| TRADE NAME | abc CORPORATION | NAME OF CUSTOMER DEPARTMENT | HEAD OFFICE | CAPITAL | 100 MILLION YEN |
| REPRESENTATIVE | abc TARO | INDUSTRIAL FIELD | PRECISION EQUIPMENT | ESTABLISHED IN | DECEMBER, 1995 |

CUSTOMER SITUATION / EARNINGS PERFORMANCE FOR LAST THREE YEARS

| TERM | AMOUNT OF SALES | OPERATION PROFIT | MANAGEMENT PROFIT | CURRENT INCOME |
|---|---|---|---|---|
| JULY, 1997 | 18,885,112 | 550,245 | 500,245 | 43,267 |

BASIS FOR CREDIT LINE CALCULATION

APPLIED CREDIT LINE: 200 MILLION UNTIL JAN. 1997   PRESENT AMOUNT: 2 MILLION

| NAME OF PRODUCT (PER MONTH) QUANTITY AMOUNT | NOISU SHIELDING WALL: 290 MILLION YEN IN AOYAGI DISTRICT | SUPPLIER | ZZZ INDUSTRIES |
|---|---|---|---|
| CONDITION FOR RECOVERY | 40% CASH, 60% 120-DAY DRAFT | PURCHASE CONDITION | 40% CASH, 60% 120-DAY DRAFT |

CREDIT LINE CALCULATION

MONTHLY BUSINESS VOLUME × 1.05(CONSUMPTION TAX) × TERM(IN MONTH)/0.9

EXAMINATION/DECISION SITUATION LIST d1 — DEPARTMENT NUMBER:010   d2 — DRAFT PLAN NUMBER:19971001   d3 — APPLICATION DATE:1997/0X/XX d4 — APPLICATION CATEGORY:CREDIT LINE DRAFT(7 MILLION YEN OR LESS)   d5 — PRIORITY:NORMAL d6 — APPLICANT:X X X X   d7 — PRIOR CONSULTATION:

d8 — DECISION ITEM:REGARDING CREDIT LINE FOR abc CORP.

| EXAMINER/ AUTHORIZER | SUBSTITUTE PERSON | DATE OF TRANSACTION | DECISION CONTROL LEVEL | COMMENT | SITUATION |
|---|---|---|---|---|---|
| ○○ ○○ | | 1997/XX/XX | EXAMINATION | | APPROVAL |
| △△ △△ | | | DECISION | | | d10   d11   d12   d13   d14   d15   d16

NEW SUPPLIER DRAFT PLAN

|← C →|← D →|

APPLICATION : [▼]  PRIORITY LEVEL : ● NORMAL ○ URGENT ROUTE CHANGE (ADDED AFTER CONSULTATION)   ● NOT CHANGED ○ CHANGED
CATEGORY

PRIOR CONSULTATION : [          ]   APPLICATION DATE : [1997OXXX]

NAME OF SUBJECT :

[APPLICATION(SENDING)] [RETURN] [CLEAR]

| FURIGANA | エービーシャケン | ADDRESS OF HEAD OFFICE | |
| TRADE NAME | ABC CONSTRUCTION | NAME OF CUSTOMER DEPARTMENT HEAD OFFICE | CAPITAL:300 MILLION YEN |
| REPRESENT | ABC TARO | INDUSTRIAL FIELD FISHERIES, AGRICULTURE & FORESTRY | ESTABLISHED IN: |

NAME OF JOB(SITE & CONSTRUCTION NAME)

HIGHWAY NOISE SHIELDING WALL: [▲]
290 MILLION YEN                [▼]

SOLD TO

ZZZ INDUSTRIES

AMOUNT OF BUSINESS:33 MILLION YEN UNTIL

PAYMENT TERMS

INVOICE ACCEPTED UNTIL 10th DAY [▲]
OF EACH MONTH AND PAYMENT ON 10th
DAY NEXT MONTH                 [▼]

CONDITION FOR RECOVERY

INVOICE ACCEPTED UNTIL 10th DAY  [▲]
OF EACH MONTH AND PAYMENT ON 10th
DAY NEXT MONTH

CUSTOMER SITUATION / EARNINGS PERFORMANCE FOR LAST THREE YEARS

| CREDIT LINE CALCULATION | AMOUNT OF SALES | OPERATING PROFIT | MANAGEMENT PROFIT | CURRENT INCOME |
|---|---|---|---|---|
| JULY 1995 | 20,814,893 | 667,287 | 239,565 | 26,295 |

F I G. 1 6

DOCUMENT MANAGEMENT APPARATUS AND METHOD, A RECORDING MEDIUM STORING A DOCUMENT MANAGEMENT PROGRAM, AND A RECORDING MEDIUM STORING A DECISION-MAKING PROGRAM

BACKGROUND OF THE INVENTION

1. Field of the Invention

The present invention relates to a document management apparatus and method and a recording medium storing a document management program, which have instruction data defining a display format for documents generated during the course of transactions, and more specifically to a document management apparatus and method suitably applicable to computer-based decision making transactions on money, credit, etc., to a recording medium storing a document management program, and to a recording medium storing a decision making program.

2. Description of a Related Art

The time spent handling documents during daily business routines, including waste of time due to loss of documents and absence of an authorizer in charge, has come to be a significant problem to companies. To solve this problem a workflow management system has been developed.

The workflow management system is intended to share information related to office works among different departments and manage the flow of information. By utilizing this workflow management system in a way that matches the kind of transaction performed, it is possible to build and manage various flows of transactions, such as individual work flows differing from one department to another in a company and work flows spanning between different departments, and to transform document delivery and job management into quick and secure electronic transactions. This can eliminate handling of paper documents or bills, nuisance of their management, delay of document processing, or waste of time caused by erroneous delivery or loss of documents. Further, digital flows of transactions allow one to easily grasp the flow and situation of the entire transactions.

When using this workflow management system, the necessary procedure involves first defining a workflow suited to the transactions to be performed, persons in charge of respective transactions and the order of transfer of the transactions, and the conditions of transfer. When executing this workflow, the system is automatically started at client terminals of the staffs according to the definitions and the processed transaction is transferred to the next person in charge.

Such a workflow management system is known to be used mainly in the processing of commodity purchase applications for approval and the management of technical documents. An example of a general decision making system for approving applications of credit line will be described as follows.

The decision making system includes an application subsystem, which prepares an application document based on application data entered by an applicant, and a decision making subsystem, which references the application document from the application subsystem and giving approval accordingly. In such a decision making system, the applicant enters necessary data for application according to an input screen displayed by the application subsystem. Based on the application data thus entered, the application subsystem prepares an application document for approval.

Next, an examiner or authorizer who recognizes having received an application by starting the decision making subsystem references the application document and makes an appropriate decision on the application. The result of decision is notified to the applicant and, when it is approved, the system performs post processing according to the application. When it is not approved, the application is withdrawn. Or the application is filed again.

As described above, the decision making system performs its processing according to the predefined workflow. In such a system, it is required to predefine a data structure of the application document commonly used in the decision making process or transaction and thus the system must be designed and developed by taking the data structure into account. How data is handled by the decision making system will be explained by referring to FIG. 17, which shows an example on-screen display of commonly shared data in a conventional system.

In FIG. 17, reference numeral 101 represents an input screen, which has input fields a-f that are displayed by the application subsystem. Designated 102 is an input screen information list, which represents the correspondence between application input data entered in the input fields a-f on the input screen 101 and setting items of the application document 110. The application input data entered on the input screen 101 are set in the corresponding setting items of the application document 110 according to the input screen information list 102.

Denoted 111 is a display screen which has display fields A-F. The application input data to be set in the application document 110 are set and displayed in corresponding display fields according to a display screen information list 112 described later. The display screen information list 112 defines the correspondence between the application input data set in the application document 110 and the display fields A-F on the display screen 111.

The application input data entered by the applicant into the input fields a-f on the input screen 101 are set by the application subsystem into the corresponding setting items of the application document 110 according to the input screen information list 102. For example, the application input data entered in the input field a is recognized, from the input screen information list 102, as the data to be set in the setting item-1 that corresponds to the input field a, and then set accordingly. For other application input data, the similar processing is carried out to complete the application document 110.

Displaying the application document 110 thus completed first involves generating the display screen 111 for displaying the application document 110 and the display screen information list 112 for defining the correspondence between the display fields on the display screen 111 and the setting items in the application document 110. The display screen 111 are prepared for each type of transaction because different transactions have different display formats in terms of display fields, display information and the like. When the generated display screen 111 is to be displayed, the application input data corresponding to respective display fields are acquired from the application document 110 according to the display screen information list 112 and then set and displayed in the predetermined positions.

In more detail, in displaying the application input data for the setting item-1 of the application document 110, the system first references the display screen information list 112 and determines that the display field for the setting item-1 is a display field A. Next, the system obtains the application input data from the setting item-1 of the application document 110 and makes necessary setting to display the acquired application input data in the display field A on the display screen. For other setting items, the similar processing is performed to set and display the acquired data in the predetermined display fields on the display screen 111.

The above-described workflow management system can be efficiently applied for transactions that use a fixed common data structure. However, as the number of users of the workflow management system increases, a need arises to cope with exceptional processing and there are increasing cases where exceptional transactions cannot be dealt with by the conventional fixed common data structure, resulting in an increase in the number of system modifications.

For example, in a system configuration where a head office LAN and branch offices' LANs are interconnected via public networks, when the decision making system that has been used only in the head office is also used in remote branch offices, the contents of the application document 110 that are good for use only in the head office may not be appropriate for use in branches. Such a case is described by referring to FIG. 17.

In such an inconvenient case, conventional practice involves making additions or modifications to the data structure of the application document 110, or adding a new application document 110 to the decision making system. Hence, it is necessary to make changes to both subsystems, the application subsystem and the decision making subsystem.

In more detail, when making changes to the conventional application document 110, the conventional procedure is to first review the data structure of the application document 110 used in the decision making system and make necessary changes to suit the data structure to the kind of transactions to be performed. As to the application subsystem, the screen layout of the input screen 101 should be modified to enter necessary information into the modified data structure and at the same time the input screen information list 102 should also be modified. Based on the modified input screen information list, the application input data entered into the modified input screen 101 are used to generate the application document 110.

The decision making subsystem, on the other hand, is required to make changes to the display screen information list 112 and the display screen 111 according to the modified data structure of the application document 110, and to display the display screen 111 based on the application document 110 and the display screen information list 112.

Next, when a new application document 110 is to be added to the decision making system, it is necessary to first generate a new data structure for the application document 110 suited for the transaction to be performed. There are two methods for modifying the application subsystem, i.e., modifying the application subsystem and adding a new application subsystem.

The method of modifying the application subsystem involves newly generating an input screen 101 for entering application input data required by the data structure of the newly added application document 110 and also generating an input screen information list 102. Alternatively, the conventional input screen 101 and input screen information list 102 are modified. Modifications or functional additions are made, such as generating an application document 110 from the application input data entered from the input screen 101 based on the input screen information list 102. In this case, the modification of the decision making subsystem requires changing the display screen 111 and the display screen information list 112 according to the modified data structure of the application document 110.

Next, in the method of newly adding an application subsystem, a display screen 111 and a display screen information list 112 are newly generated. In this case, because of the addition of a new application subsystem, the modification of the decision making subsystem requires adding processing for determining by which application subsystem, conventional or new subsystem, the application document 110 has been generated and also newly generating a display screen 111 and a display screen information list 112 to meet the newly added data structure of the newly generated application document 110. Alternatively, it is necessary to modify the conventional display screen 111 and display screen information list 112 according to the newly added data structure.

As described above, the conventional decision making system has a drawback that to modify the data structure of the application document 110 or to modify the decision making system as a result of addition of transactions requires making changes to both subsystems, i.e., the application subsystem and the decision making subsystem. That is, any change in the data structure or the like on the application document generation side requires a corresponding change on the display side.

This problem is commonly experienced by systems which manage a plurality of documents generated during the course of performing transactions and which display these documents according to their data structure and in response to the execution of the transaction.

SUMMARY OF THE INVENTION

The present invention has been accomplished with a view to overcoming the above-described drawback and it is an object of the invention to provide a document management apparatus and method which can display documents under management generated during the course of transactions without the user having to be aware of the data structure of the documents. It is also an object of the invention to provide a recording medium that stores a document management program for such an apparatus and method. It is another object of the invention to provide a recording medium that stores a decision making program capable of displaying application documents under management generated during the course of decision making transactions without the user having to be aware of the data structure of the application documents.

In order to attain the above object, in accordance with the first aspect of the present invention, as shown in the fundamental configuration diagram of FIG. 1, there is provided a document management apparatus for managing a plurality of documents each of which has a combination of transaction data and instruction data, the transaction data including variable data entered during the course of a transaction and fixed data for the transaction, the instruction data defining a display format for the transaction data; the document management apparatus comprising: a management information generating means 1 for generating management information used to manage the plurality of documents; a storage means 2 for relating the plurality of documents with the management information generated by the management information generating means and storing the related documents and management information; and a display control means 3 for making a display, based on the management information stored in the storage means 2, to allow selection of one of the documents, and for displaying the selected document in a display format as defined by the instruction data contained in that document.

In this configuration, the document generated by combining the transaction data and the instruction data is associated with the management information generated by the management information generating means 1 and is stored in the storage means 2. Then, the display control means 3 makes a display for selecting one of the plurality of documents based on the management information stored in the storage means 2 and the document selected on this display is displayed in a display format defined by the instruction data contained in this document.

Because a plurality of documents under management are displayed in a display format as specified by the instruction data contained in each document, there is no need for the user to become conscious of the data structure of the document on the document display side. That is, if changes or modifications are made to the data structure or the like on the document generation side, the corresponding modifications will not occur on the display side. Further, in the case where the document display format differs from one transaction to another, because the document display is made in a display format as specified by the instruction data contained in each document, addition of new transactions will not result in corresponding addition of processing on the display side. This eliminates the problem, experienced with the conventional document management apparatus, that any change or modification in the document data structure and addition of transactions on the generation side necessarily requires corresponding modifications on the display side. This also applies to the document management method and the recording medium storing a document management program. It is therefore possible to provide a document management apparatus and method which can display a document without the user being conscious of the data structure of the document generated during the course of a transaction. It is also possible to provide a recording medium storing a document management program, and a recording medium storing a decision making program.

Preferably, the document management apparatus further comprises a document generating means 4 which, in response to a request for generating the document, displays the document into which the variable data can be entered, and combines the variable data entered from the display with the document to generate the document.

In this configuration, the document generating means 4 displays the document capable of receiving inputs at the variable data section, and combines the variable data entered from the display with the document to complete the document. Because a document is generated by reflecting only the input variable data on the document displayed for the input of the variable data, it is possible to display on the display side the document as it appears on the generation side when the variable data is completely entered. This can also be said of the document management method and the recording medium storing a document management program.

In accordance with the second aspect of the present invention, there is provided a document management method for managing a plurality of documents each of which has a combination of transaction data and instruction data, the transaction data including variable data entered during the course of a transaction and fixed data for the transaction, the instruction data defining a display format for the transaction data; the document management method comprising the steps of: generating management information for managing the plurality of documents; relating the plurality of documents with the generated management information and storing the related documents and management information; and making a display, based on the stored management information, to allow selection of one of the documents, and displaying the document selected on the display in a display format as defined by the instruction data contained in that document.

Preferably, the document management method comprises the further step of: in response to a request for generating the document, displaying the document into which the variable data can be entered, and combining the variable data entered from the display with the document to generate the document.

In accordance with the third aspect of the present invention, there is provided a computer-readable recording medium storing a program for causing a computer to manage a plurality of documents, each of which has a combination of transaction data and instruction data, the transaction data including variable data entered during the course of a transaction and fixed data for the transaction, the instruction data defining a display format for the transaction data; the computer-readable recording medium storing a document management program for causing the computer to execute the steps of: generating management information for managing the plurality of documents; relating the plurality of documents with the generated management information and storing the related documents and management information; and making a display, based on the stored management information, to allow selection of one of the documents, and displaying the document selected on the display in a display format as defined by the instruction data contained in that document.

Preferably, the computer-readable recording medium stores a document management program for causing the computer to execute the step of: in response to a request for generating the document, displaying the document into which the variable data can be entered, and combining the variable data entered from the display with the document to generate the document.

In accordance with the fourth aspect of the present invention, there is provided a computer-readable recording medium storing a decision making program for causing a computer to manage a plurality of application documents and to display the application documents so as to make decision on the application documents under management, each of the application documents having application data and instruction data, the application data including variable data entered during the course of a decision making transaction and fixed data for the decision making transaction, the instruction data defining a display format for the application data; the computer-readable recording medium storing a decision making program for causing the computer to execute the steps of: generating management information for managing the plurality of application documents; relating the plurality of application documents with the generated management information and storing the related application documents and management information; and generating application document list display data for displaying an application document list based on the stored management information to allow selection of one of the plurality of application documents, making a display based on the application document list display data, and displaying the application document selected on the display in a display format as defined by the instruction data contained in that application document.

In this configuration, the application document generated by combining the application data and the instruction data is associated with the management information and stored. Then, based on the stored management information the application document list is displayed for selecting one of the plurality of application documents, and the application document selected on this display is displayed in a display format as defined by the instruction data contained in this document. Because, also in the decision making processing, a plurality of application documents under management are each displayed in a display format as specified by the instruction data contained in each application document, there is no need to provide a display means based on the data structure of the application document on the decision making side that manages the application documents. Hence, it is only necessary to prepare a display means that displays the document in a display format as defined by the instruction data contained in each application document. Therefore, even when changes or modifications occur to the data structure of the application document on the application generation side, the above configuration can prevent the corresponding changes from occurring on the decision making side.

Preferably, the computer-readable recording medium stores a decision making program for causing the computer to execute the step of: in response to a request for generating the application document, displaying the application document into which the variable data can be entered, and combining the variable data entered from the display with the document to generate the document.

In this configuration, the application document capable of receiving inputs at the variable data section is displayed and the variable data entered from this display is combined with the application document to generate the application document. Therefore, because an application document is generated by reflecting only the input variable data on the application document that is displayed for the input of the variable data, it is possible to display on the display side the application document as it appears on the generation side when the variable data is completely entered. Hence, the display of the application document can be made entirely the same both on the application side and on the decision making side.

Preferably, the application document stores a decision making program for causing the computer to execute the steps of: relating supplementary information to the management information, the supplementary information being attached to the application document to supplement the content of the application document; and making a display for selecting the supplementary information when the presence of the supplementary information for the application document is recognized based on the management information.

In this configuration, when supplementary information for supplementing the content of the application document is related to the management information and stored, an indication appears that allows the user to select the supplementary information. The authorizer therefore can recognize the presence or absence of the supplementary information for the application document.

Preferably, the computer-readable recording medium stores a decision making program for causing the computer to execute the steps of: when generating the management information having a plurality of management items, retrieving as one of the management items an application category for classifying the decision on the application document; retrieving authorizer information for the application document from authorizer information prepared in advance that defines authorizers for each of the application categories; in response to a request from the authorizer, detecting the management information corresponding to the authorizer based on the retrieved authorizer information; and generating the application document list display data for displaying the application document list based on the detected management information.

In this configuration, authorizer information that defines authorizers for each application category that classifies the decisions on the application documents is prepared in advance. In response to a request from an authorizer, the management information associated with the authorizer is detected based on the authorizer information retrieved according to the application category of the management information. Based on the detected management information, the application document list display data is generated. Because the application document list is displayed according to the application document list display data, it is possible to display only a list of application documents under the charge of the authorizer. Further, because the application category that classifies the decision on the application document is used in the management information as one of the management items, even when the kind of application document is added or deleted, this can easily be dealt with by adding or deleting the corresponding application category and the authorizer information associated with that application category.

Preferably, the computer-readable recording medium stores a decision making program for causing the computer to execute the step of: when generating the application document list display data for displaying the application document list in response to the request from the authorizer, controlling an order of decision making by the authorizers defined in the authorizer information according to decision order information and decision state information, the decision order information having an order of the authorizers preset in the retrieved authorizer information, the decision state information having a decision state set according to the progress of decision making on the application document.

In this configuration, because the order of decision making by authorizers defined in the authorizer information is controlled based on the decision order information, which predefines the order of authorizers, and the decision state information in the management information, which sets the decision state according to the progress of decision making on the application document, the decision making procedure on the application documents can be performed in the predefined order of authorizers.

Preferably, the computer-readable recording medium stores a decision making program for causing the computer to execute the step of: inputting decision state confirmation information to confirm the progress of decision making on the application document; retrieving the management information according to the decision state confirmation information entered; generating decision state display data representing the progress of decision making on the application document based on the management items of the retrieved management information and on the authorizer information; and displaying decision state of the application document based on the decision state display data.

In this configuration, because the decision state display data for displaying the progress of decision making on the application documents is generated according to the management items of the management information and the authorizer information and, based on the decision state display data, the decision state for the application documents is displayed, the authorizer can confirm the state of decision on the application documents under his charge.

Preferably, the computer-readable recording medium stores a decision making program for causing the computer to execute the step of: inputting change request information for changing the authorizer; and changing the authorizer information according to the change request information entered.

In this configuration, because the authorizer information is changed according to change request information entered, if an authorizer change occurs as by personnel changes after the application document has been accepted, the necessary change of authorizer can be made quickly. Hence, a delay in decision on the application document, which would otherwise occur as a result of change of authorizer, can be prevented.

Preferably, the computer-readable recording medium stores a decision making program for causing the computer to execute the step of: inputting substitute designation information for designating the authorizer and a substitute person who will perform the decision making on behalf of the authorizer; detecting the authorizer information associated with the authorizer according to the substitute designation information entered; and relating the detected authorizer information with substitute information associated with the substitute person designated by the substitute designation information.

In this configuration, when substitute designation information is entered that specifies an authorizer and a substitute person who acts on behalf of the authorizer, the authorizer information and the substitute information are connected with each other according to the substitute designation information. Hence, even when the authorizer is absent on business trip for example, the authorizer can be quickly replaced with the substitute person, preventing a delay in decision on the application document which would otherwise be caused due to absence of the authorizer in charge.

The above and other objects and features of the present invention will be more apparent from the following description taken in conjunction with the accompanying drawings.

BRIEF DESCRIPTION OF THE DRAWINGS

FIG. 1 is a schematic diagram showing a fundamental configuration of a document management apparatus according to the present invention;

FIG. 2 is a schematic diagram showing a system configuration of a decision making system;

FIG. 6 is a diagram showing a general workflow performed by the decision making system;

FIG. 7 illustrates an input screen format used in the application subsystem which represents a credit line draft plan circulated for approval;

FIG. 8A illustrates a data structure of authorizer information;

FIG. 8B illustrates a data structure of personal information contained in authorizer information;

FIG. 11 illustrates an examination/decision list display screen in the decision making subsystem;

FIG. 12 illustrates an application content display screen used in the decision making subsystem which represents a credit line draft plan circulated for approval;

FIG. 13 illustrates a screen showing a list of examination/decision situation on the application information shown in FIG. 12;

FIG. 16 illustrates an input screen configuration for a newly generated input screen format used in the decision making subsystem which represents a supplier draft plan circulated for approval.

DESCRIPTION OF THE PREFERRED EMBODIMENTS

Figures 3, 4, 5:
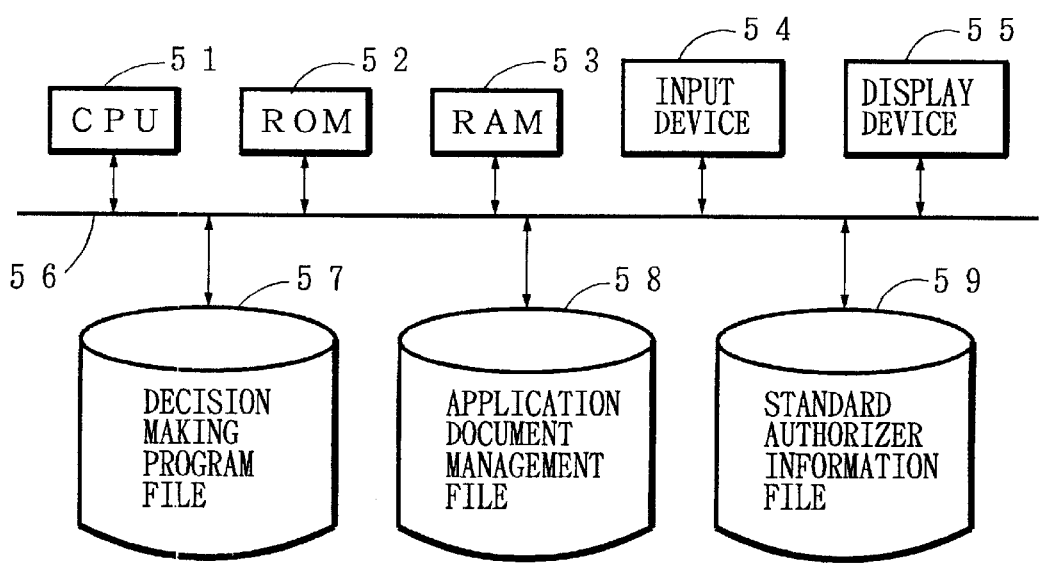
FIG. 3 is a schematic diagram showing a system configuration of terminals of a server 10 in FIG. 2.
FIG. 4 is a list showing a data structure of management information used by the decision making system for managing application information.
FIG. 5 is a list showing a data structure of application information having application content data.

Now, one embodiment of a decision making system according to the present invention will be described by referring to FIGS. 2 through 15. The decision making system that gives an approval to an application of transaction comprises: an application subsystem for generating application content data based on information entered by an applicant and applying for approval; and a decision making subsystem for checking the application document submitted by the application subsystem and giving an approval according the check result.

FIG. 2 shows a system configuration of the decision making system. In FIG. 2, reference symbols A and B represent client server systems. In the client server system A, reference number 10 represents a server, 11, 12, 13 and 14 clients, and 20 a telecommunication circuit. The telecommunication circuit 20 connects the server 10 and the terminals of clients 11–14 to form a LAN. Similarly, in the client server system B, 10a represents a server, 11a, 12a and 13a clients, and 20 a telecommunication circuit. The telecommunication circuit 20 interconnects the server 10a and the terminals of clients 11a–13a to form a LAN.

Denoted 21 is a public network, which is a telecommunication circuit provided by a carrier, such as subscribers' telephone network of switched connection type, a packet-switched network and ISDN. The client server systems A and B are connected via a device that interconnects LANs, such as a router and brouter, and the public network 21. This configuration makes it possible to cope with a demand for processing of transactions from remote places. The public network 21 may be replaced with the Internet or used in combination with the Internet.

An embodiment of the decision making system will be explained, with the client server system A taken as a head office and the client server system B as a remote branch office.

The server 10 represents a server in the head office and has a database 30 managed by the head office. In this embodiment, although the location of the database 30 is defined to be in a storage device of a terminal of the server 10, it may be located in a storage device of other terminal.

Under the server 10 there are a client 11 or a terminal of an applicant, a client 12 or a terminal of an examiner, a client 13 or a terminal of an authorizer, and a client 14 or a terminal of a person in charge of accounting.

The server 10a of the client server system B represents a server of a remote branch office. Under the server 10a there are a client 11a or a terminal of an applicant, a client 12a or a terminal of an examiner, and a client 13a or a terminal of an authorizer. While in this embodiment the client server systems A and B are both connected with only a smaller number of terminals, they may include additional terminals.

FIG. 3 shows a system configuration of the terminal of the server 10. In FIG. 3, reference number 51 denotes a CPU, which executes a decision making program to specify, search and retrieve the application content data to be displayed. Designated 52 is a ROM which stores a program that controls the CPU 51 when starting terminals. Denoted 53 is a RAM which temporarily stores management information, application content data, application information and the like.

Denoted 54 is an input device, such as keyboard and mouse. Reference numeral 55 is a display device, such as a display. A bus line is connected with the input device 54 and the display device 55. The system configurations of the client terminals other than the server, from CPU 51 to display device 55, are basically the same.

In this configuration, the storage device of the server 10 contains the following files. A decision making program file 57 has a program for executing the decision making transaction, a management information data structure, and the like. An application document management file 58 is used to manage application documents in a draft plan number assignment processing when the application subsystem submits an application document. A standard authorizer information file 59 includes standard authorizer information that defines authorizers for each category of application.

The standard authorizer information file 59 is used to retrieve the standard authorizer information according to the application category when the application subsystem submits an application document. Based on the acquired standard authorizer information, authorizer information for that particular application document is generated and then stored along with associated management information. This authorizer information determines authorizers in charge of that application document and also their order.

For example, if the category of the application document is a "credit line draft plan," a search is made through a plurality of standard authorizer information prepared in advance and stored in the standard authorizer information file 59 to detect the standard authorizer information corresponding to the application category of "credit line draft plan." Based on this standard authorizer information, authorizer information for that application document is generated and stored in the database 30 along with the associated management information. If the authorizer information is set such that the first authorizer is deputy general manager and the second authorizer is general manager, the authorization process proceeds in that order.

In this embodiment, the authorizer information is generated based on the standard authorizer information. It is also possible to prepare the names of authorizers in the form of the authorizer information in advance and store them along with assigned application categories. However, by preparing the minimum information in the form of the standard authorizer information in the decision making system and thereafter making additions and changes, as necessary, to the standard authorizer information, as in this embodiment, the standard authorizer information can be utilized in a variety of different systems with similar processing.

The decision making program for having the computer execute the above-described processing of the decision making system is recorded in mediums such as floppy discs, CD-ROMs, MOs, DVD-ROM, etc. for distribution. It can also be distributed by downloading from the Internet.

The decision making program thus obtained is installed in a terminal as the decision making program file 57, which is run to perform the decision making transaction. In this embodiment although the decision making program is installed in the terminal of the server 10 of the client server system A in FIG. 2, it may be installed in the terminal of a client not the server.

Next, a data structure commonly used in the decision making process of the decision making system will be explained. FIG. 4 illustrates the data structure of management information used by the decision making system to manage the application information. The management information is generated as an application file by the application subsystem. This management information includes data necessary for the decision making process performed by the decision making subsystem. Hence, having the data structure of the management information arranged in a commonly usable manner enables transactions with similar work flows to be performed in a common way.

In FIG. 4, C1 represents a department number which is set, by the application subsystem, with a predefined department number corresponding to the business department to which an applicant belongs. C2 denotes a draft plan number, which is set according to the application document management file 58 when the application subsystem submits the application information for approval. C3 denotes a staff number, which is the information to identify an applicant and is set with a predefined unique staff number corresponding to that applicant by the application subsystem.

C4 designates a date of application, which is set, by the application subsystem, with date information about when the application information entered from the input screen is filed. C5 denotes an application category, which allows the application information to be classed in a group. Each application category C5 has its own authorizer information that defines the authorizers. The application category C5 allows selection from the input screen of such information as "draft plan for credit line equal to or lower than 7 million yen" or "draft plan for credit line equal to or lower than 10 million yen." The information selected by the application subsystem is set in the application category C5.

When new transactions are added to the decision making system, the application category C5 needs to be added. For example, when adding a new supplier draft plan, category information called "new supplier draft plan" is added and the standard authorizer information corresponding to this application category is also added. Then, adding new processing that corresponds to this application category to the system allows the additional transactions to be processed.

C6 indicates a level of priority, which is used by the decision making subsystem to determine whether the application information is urgent or not. Information of "normal" or "urgent" is entered from the input screen and is set by the application subsystem.

C7 is prior consultation information, which is used to inform an examiner or authorizer that the application information has already been referred to the authorizers. The prior consultation information is entered from the input screen and set by the application subsystem.

C8 represents a decision item which is set, by the application subsystem, with a name of the application information entered from the input screen. C9 is reference data, which is set by the application subsystem when reference data is available that supplements the application information. In more detail, this is set with a file name of reference information or with a name of file containing the address where the reference information is stored. Although in this embodiment the reference data C9 has only one item, two or more items may be provided. C10 indicates a date of decision made which is set, by the decision making subsystem, with the date that the decision on the application information was made. C11 represents a state of decision which is set, by the decision making subsystem, with the progress level of processing of the application information.

FIG. 5 shows the data structure used for the application information having application content data. This application information is generated as an application content file by the application subsystem at time of application. In FIG. 5, D1 represents a department number which is set, by the application subsystem, with a predefined department number corresponding to the department to which the applicant belongs. D2 represents a draft plan number which is set by the application subsystem according to the application document management file 58 when filing the application information. The draft plan number D2 and the draft plan number C2 of the management information are used to relate the management information with the application information.

D3 represents a division number which, when application content data D4 described later is divided into a plurality of contents and stored, connects them together. In this case, there are as many division numbers as there are divisions of the application information, and the data are related together by the division numbers D3. When the application content data D4 is not divided, an initial value is set signifying that the data is not divided. If it is assumed that the application content data D4 will not be divided, there is no need to provide the division number D3.

D4 is application content data which is set, by the application subsystem, with the data that is produced by adding to the application input data entered from the input screen the instruction data defining the display format so that the screen display layout will be as predetermined by the application subsystem. By making the data size of the application content data D4 variable, this data structure can be used even when the display content differs from one transaction to another. Although in this embodiment the application information consists of the department number D1, the draft plan number D2, the division number D3 and the application content data D4, it may consist only of the application content data D4.

Further, the application content data D4 may be set with only the storage location of the application content data and, when the application information is output, the application content data may be referenced based on its storage location. This configuration eliminates the need for managing the application content data in one storage area and thus offers the advantage of being able to reduce the database storage capacity for the application content data.

Now, the processing performed by the decision making system with the system configuration as shown in FIG. 2 will be described by referring to a general workflow of FIG. 6 for the decision making system.

When, for example, an applicant belonging to the head office submits a draft plan on credit line for approval, the applicant starts the application subsystem of the decision making program file 57 installed in the server 10 and enters application items necessary for the application for approval by using the input device 54 from the input screen on the display device 55 through the application subsystem. The data thus entered is used to generate the management information and the application information according to the predefined data structures for the management information and application information in the decision making system (step W10).

The standard authorizer information corresponding to the information set in the application category C5 of the management information thus generated is retrieved from the standard authorizer information file 59. Based on the standard authorizer information retrieved, authorizer information is generated. The authorizer information, the management information and the application information are related with one another and stored in the database 30 of the server 10. Then, according to the authorizer information, the application information is applied to the corresponding examiner and authorizer (step W11). A series of steps from W10 to W11 is performed by the application subsystem.

Next, at a client 12, the decision making subsystem in the decision making program file 57 installed in the server 10 is started. The examiner who is now aware of having received the application information references the application information stored in the database 30 and examines it (step W20). Next, according to the result of examination, a decision is made on whether or not to approve the application (step W21). If the application information is approved, the processing proceeds to step W22. If it is not approved, the result of decision on the application information is notified to the applicant.

When the application is approved at step W21, a check is made to see whether the examination is completed according to the authorizer information corresponding to the application information (step W22). If there are two or more examiners, the next examiner is notified that he or she has received the application information. The examiner then performs a series of examination steps from W20 to W22. This series of steps are repeated the same number of times as the number of the examiners. When the examination process is completed, the decision making subsystem informs the authorizer that he or she has received the application information. The series of steps from W20 to W22 constitutes the examination procedure. If the examination procedure is not necessary, these steps are not performed.

At a client 13, as in the case with the examiner, an authorizer who, after starting the decision making subsystem, becomes aware of having received the application information now references the application information stored in the database 30 and conducts a decision making procedure (step W23). According to the result of decision made by the authorizer on the application information, a decision is made on whether the application should be approved or not (step W24). When the application information is given an approval, the processing proceeds to step W30. When the application information is not approved, the result of decision on the application information is informed to the applicant. A series of steps from W23 to W24 constitute the procedure carried out by the authorizer.

The application information approved by the authorizer is notified to the applicant and the accounting staff by the decision making subsystem. Then, at a client 14, the accounting staff who, by means of a decision follow-up subsystem making up the decision making system, becomes aware of having received a request for post-transaction processing now references the application information stored in the database 30 and performs an accounting procedure according to the content of the application information.

When the branch office uses the above-described decision making system, if an environment exists in which the client server system B can access the client server system A, the client server system B can utilize the decision making system of the client server system A without installing the decision making system in the server 10a. In this case, an applicant accesses the server 10 of the client server system A from the client 11a through the public network 21 to start the application subsystem and performs processing similar to that performed by an applicant of the head office. This also applies to the examiner and to the authorizer.

Figure 7:
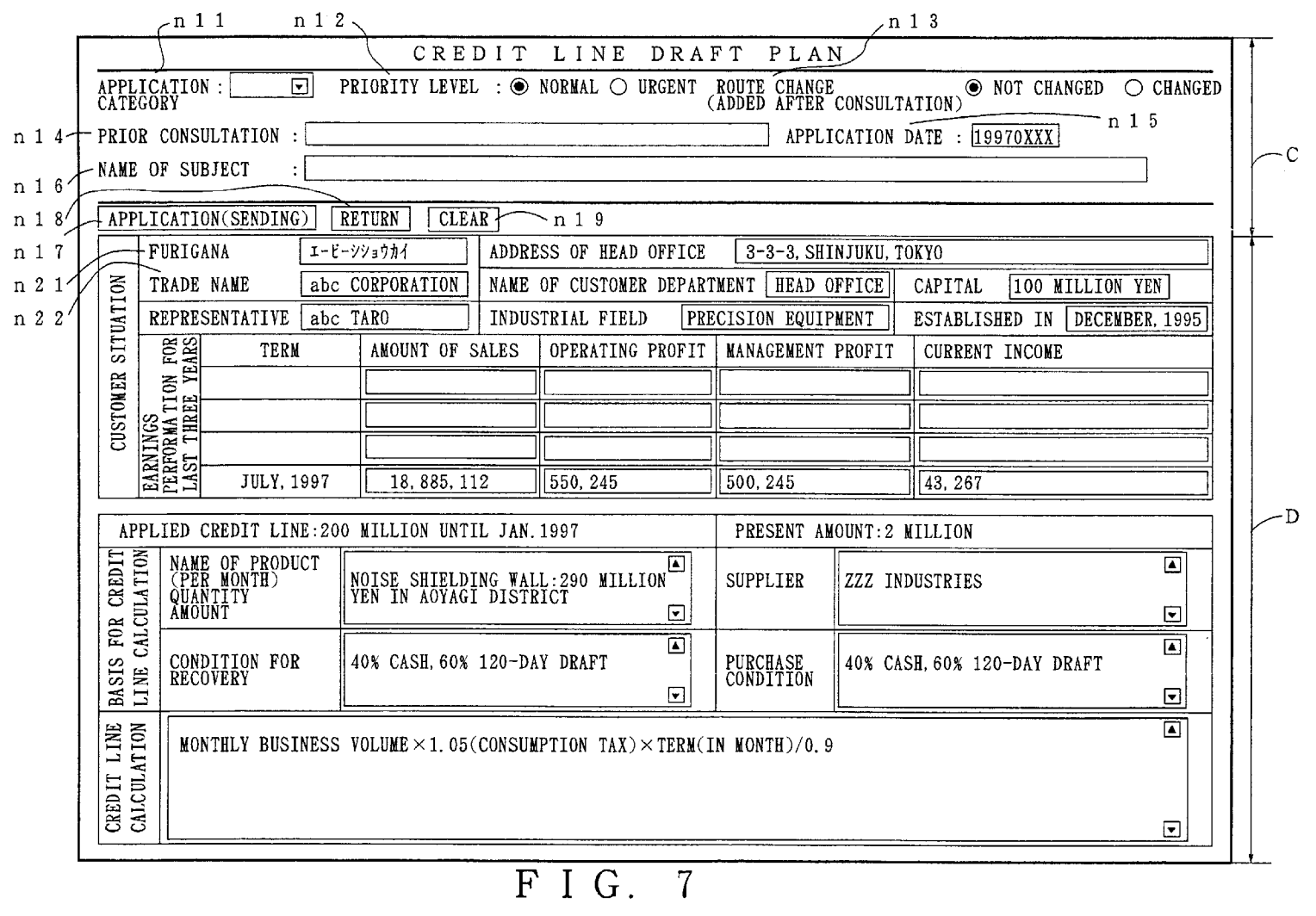

FIG. 7 shows the input screen configuration for the credit line draft plan. In FIG. 7, C represents a common section on the input screen, which includes fields n11 to n19 described later and is common to all input screens of different transactions. A part of the application input data entered from this input screen corresponds to the data structure items of the management information shown in FIG. 4.

In the input screen common section C of FIG. 7, n11 represents an application category input field, which displays a list of setting items for a plurality of application categories corresponding to the authorizer information. Selection by the applicant of a desired application category results in the selected information being set in the application category C5 by the application subsystem. Denoted n12 is a priority level input field. Selection by the applicant of a small button representing the priority level of either "normal" or "urgent" causes the selected priority level for the application information to be set in the priority level C6.

Designated n13 is a route change input field. When the applicant selects a small button, "present" or "not present," representing the presence or absence of a change in the authorizer information, the selected information is stored in the RAM 53 as route change request information by the application subsystem. A field n14 represents a prior consultation input field. When a prior consultation has been made about the application information, the applicant enters a memo to that effect in the prior consultation input field n14. When the data is entered in this field, the application subsystem regards the application as the one that has undergone prior consultation. When no data is entered in this field, the subsystem regards it as an ordinary draft plan. The entered information is set in the prior consultation information C7.

A field 15 represents an application date input field which is set in advance with date information obtained from the terminal when the application subsystem displays an input screen. The applicant enters a new date only when he or she wishes to change the date. Otherwise, the date information that is already displayed is set in the application date C4. A field n16 represents a subject name input field, in which the applicant enters the name of the application information. The entered information is set in the decision item C8 by the application subsystem.

A field n17 represents an application button n17, which is used to file the application information entered by the applicant. Selection of the application button n17 causes the information entered in various fields and the information selected by various button to be stored in the RAM 53. A field 18 represents a return button which is used by the applicant when he wants to stop the screen input. A field 19 is a clear button which is used by the applicant to erase information that he entered from the input screen.

D in FIG. 7 represents a variable section of the input screen, which includes, in the case of a credit line draft plan, input fields such as a general situation of a customer, a base for determining the credit line, and details of calculating the credit line. A field n21 represents a Japanese furigana (Japanese kana showing the reading of a word) input fields, and n22 a trade name input field. When input data required to be entered in the input screen variable section D differs from one transaction to another, the input screen variable section D has a differing configuration for a different transaction. By giving a level of freedom to the configuration of the input screen variable section D in this way, it is possible to cope with different transactions that are performed along the similar workflow.

FIG. 8 shows a data structure of the authorizer information, with FIG. 8A representing the data structure of the authorizer information and FIG. 8B representing the data structure of personal information contained in the authorizer information.

In FIG. 8A, an item R10 represents a draft plan number, which is assigned according to the application document management file 58 when the application subsystem submits the application information. An item R11 represents an application category which is set with an application category used by each decision making process. When filing the application information, a comparison is made between the application category set in the application category C5 of the management information corresponding to the application information and the application category set in the application category R11. Based on the standard authorizer information which is set with equal application categories, the authorizer information is generated. An item R20 represents personal information. As many personal information items R20 are set as there are authorizers.

In FIG. 8B, an item R21 represents a position information, which is set with the position of the authorizer, such as "deputy general manager," "general manager" and "president." R22 indicates name information, which is set with the name of the authorizer. R23 is a staff number which is set with a staff number corresponding to the authorizer. R24 represents decision control level information, which is set with decision control level information for an authorizer according to such application information as "examination" and "decision". The decision control level information R24 is used to perform control on the application information, such as preventing the authorizer in charge from making any decision on the application information while under examination, or allowing the authorizer to only reference the application information.

An item R25 represents a date of transaction, which is set with a date that the authorizer corresponding to the personal information R20 made a decision. When no decision is made, an initial value is set. R26 represents a substitute staff number, which is set with a staff number of a person who is designated to work on behalf of an examiner or authorizer set in the staff number R23 of the personal information R20. When designating a substitute staff, a period of substitution is specified. When the period expires, the information set in the substitute staff number R26 is cleared. R27 represents check information, which is set with information indicating that the authorizer corresponding to the personal information R20 has made a decision on the application information.

While this embodiment relates the personal information R20 to the substitute person information by providing the personal information R20 with the substitute staff number R26, the personal information R20 may be replaced with the substitute person information without providing the substitute staff number R26. However, by adopting the structure as shown in FIG. 8B, the substitute person can easily be returned to the original authorizer after the substitute period has expired.

The standard authorizer information has a structure similar to that of the authorizer information of FIG. 8A. The personal information R20 for the standard authorizer information has items ranging from the position information 21 to the decision control level information R24 shown in FIG. 8B. This standard authorizer information is prepared in advance for each application category. By defining the application category for each decision making transaction, a variety of kinds of standard authorizer information can be generated. Further, by defining detailed classes of application category, it is possible to set detailed decision making routes for one and the same decision making transaction.

In this embodiment, the order of arrangement of the personal information R20 is regarded as the order of authorizers. That is, by giving path information to the structure of the personal information R20 or to the personal information R20, the order of authorizers for the step W20 to step W24 in FIG. 6 can be determined.

The personal information R20 can also be used in a system in which the arrangement of the personal information R20 does not imply any meaning of the order and in which the control level set in the decision control level information R24 is taken as a hierarchical level and used to manage the authorizers.

For example, when the authorizer information corresponding to the application information consists of a total of four personal information R20, of which three personal information R20 have "examination" set in their decision control level information R24 and one personal information R20 has "decision" set in its decision control level information R24, an arrangement may be made such that when at least one of the three examiners has given approval to the application, the examination process is ended and the application proceeds to further examination at a higher level of hierarchy. This configuration can ensure a swift decision making.

Figure 9:
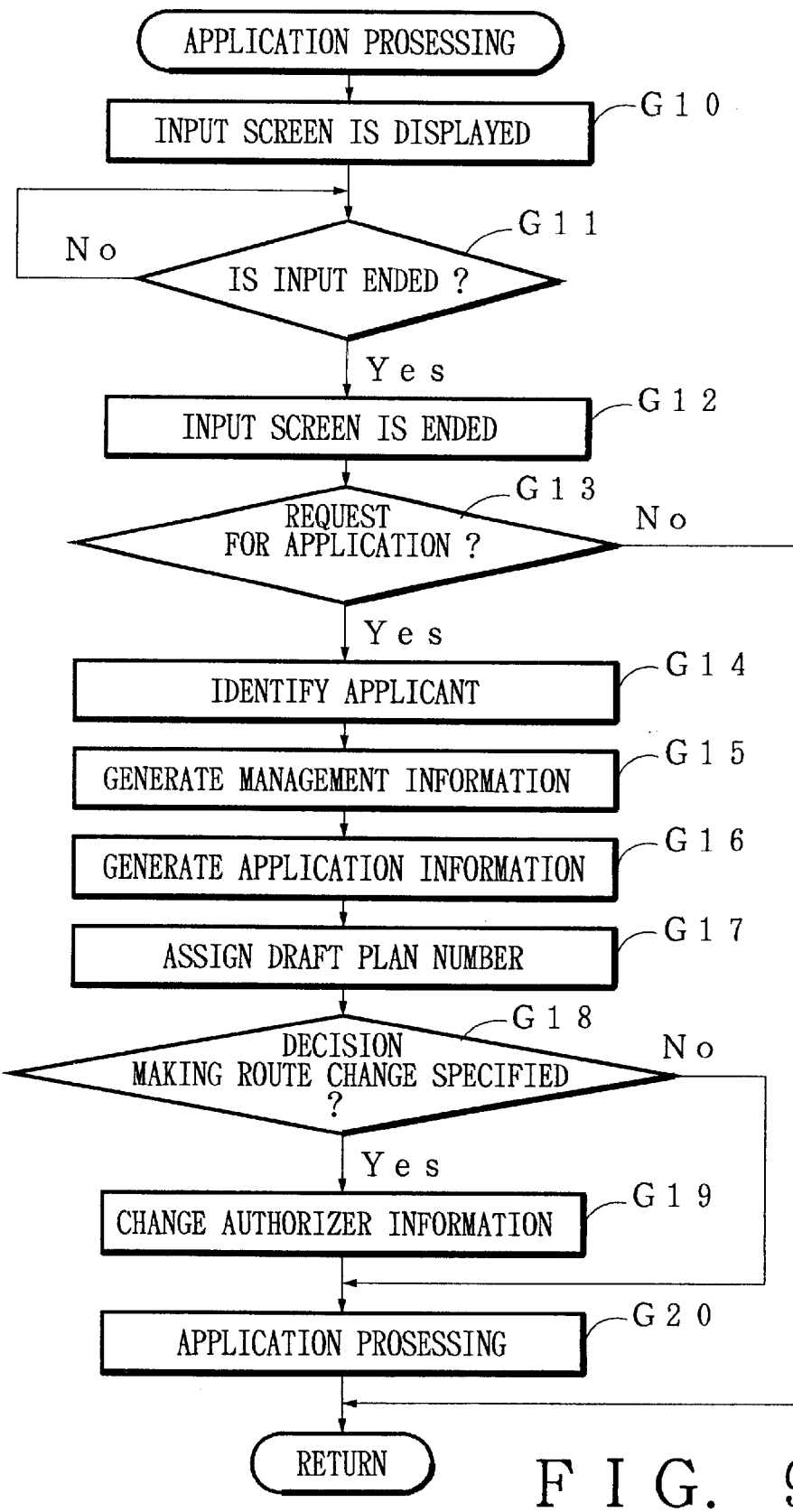
FIG. 9 is a flow chart for application processing performed by the application subsystem.

FIG. 9 shows a flow chart of the processing performed by the application subsystem in this embodiment. This flow chart shows the details of a series of steps from W10 to W11 in the workflow in FIG. 6. RAM 53 is assumed to reside in the terminal of the server 10.

The application subsystem started by the applicant at the client 11 displays an input screen of FIG. 7 on the display device 55 at the client 11 (step G10) and a request for processing entered from the input screen is monitored (step G11). Then, when it is found by step G11 that the input is ended, the input screen is erased (step G12).

Next, a check is made of whether the application input data is an application request (step G13). In more detail, a check is made to see which of the buttons on the input screen, the application button n17, return button n18 or clear button n19, has been selected by the applicant. When it is decided that the application input data is an application request, the processing moves to step G14. Otherwise, the processing is terminated. The application input data entered from the input screen is stored in the RAM 53.

When the application input data is decided to be an application request by step G13, a department number and a staff number, prepared in advance, corresponding to the applicant are retrieved and temporarily stored in the RAM 53 (step G14).

Then, according to the data structure of FIG. 5, the department number and the application content data stored in the RAM 53 are set to generate the application information in the RAM 53 (step G15). Here, the process of generating the application content data is explained in more detail.

Various data set in respective input fields in the input screen variable section D shown in FIG. 7 are stored in the RAM 53 as application input data that corresponds to variables assigned to each input field. For example, a definition is made in advance such that information set in an input field corresponding to the furigana input field n21 will be stored in a variable N21 and that information set in an input field corresponding to the trade name input field n22 will be stored in a variable N22. Similar settings are also made for other input fields. As a result, depressing the application button n17 on the input screen common section C sets "エービーシーショウカイ (abc Corporation in furigana)" in the variable N21 and "商会 (abc Corporation in Chinese kanji)" in the variable N22, and they are stored in the RAM 53.

To allow the authorizer to display these application input data on the input screen variable section D by the decision making subsystem without changing the screen layout of the input screen variable section D, application content data that provides a display similar to the input screen variable section D of FIG. 7 is generated in advance by using instruction data representing a predefined display format. Alternatively, application content data is prepared so as to provide a display similar to the input screen variable section D of FIG. 7 and at the same time a means for setting the data which are stored in variables corresponding to predetermined positions is prepared in advance.

We will explain about an example case in which, as with the furigana input field n21 of FIG. 7, there is an input field for a display item and in which the application input data entered in this input field is displayed by the decision making subsystem without changing the screen layout.

In an area corresponding to the furigana input field n21 of the prepared application content data, there are described an instruction code representing the display position and character size of a character string "フリガナ" and an instruction code indicating the presence of an input field corresponding to the furigana input field n21. The instruction codes for this input field include such data as the name and length of the input field and the maximum number of input characters. The name of this input field is related with a variable that contains the input data that one wants output to this input field. In this case, the name of the input field and the variable N21 are related with each other.

When generating the application content data by the application subsystem, the variables stored in the RAM 53 are associated with predetermined positions of the prepared application content data as described above. Hence, the instruction code for the furigana input field n21 is set with "エービーシーショウカイ" contained in the variable N21 as the data one wants to output to the input field. For other input fields in FIG. 7, the same applies. The application content data generated in this way is now set in the application content data D4 of the application information by the application subsystem.

The decision making subsystem has the display means display the application content data generated by the application subsystem in a display format as defined by the instruction data contained in the application content data.

Thus, the application information generated by the application subsystem (generation side) can be displayed as is on the decision making subsystem (display side).

Hence, also when the screen layout of the input screen variable section D is to be modified, the necessary procedure involves generating the application content data in such a manner as to match a desired display screen to which the application subsystem will modify the screen layout and, in the decision making subsystem, having the display means display the application content data in a display format as defined by the instruction data. This allows the display screen generated by the application subsystem to be displayed as is. This means that modifications resulting from the screen layout change for the application information need only to be performed by the application subsystem.

As can be seen from the above explanation, the application input data corresponds to the variable data set forth in the appended claims and data such as "general situation of a customer," "furigana" and "trade name" correspond to the fixed data in the appended claims. The application content data D4 of the application information corresponds to the application document in the appended claims. Although in this embodiment the application information has items ranging from department number D1 to division number D3, the application information may include only the application content data D4 and may be taken as the application document in the appended claims.

Next, according to the data structure of FIG. 4, the application input data and various data such as department number and staff number are set in predetermined areas to generate the management information in the RAM 53 (step G16).

In step G16, when there is supplementary information that supplements the application information, it is put in the reference data C9. In this embodiment, only the reference data information including a storage address is set. In detail, the access method, the host name, the storage location and the file name of the reference data are set. This arrangement obviates the need to store the reference data in the database 30, which in turn makes it possible to reduce the storage capacity that the database 30 requires for each of the application information. For the handling of the reference data, other arrangements may be made. For example, only the file name of the reference data is set in the reference data C9 of the management information and the reference data is also stored in the database 30 along with the management information and the application information.

Further, the standard authorizer information corresponding to the application category set in the application category C5 of the management information is extracted from a plurality of standard authorizer information stored in the standard authorizer information file 59. Based on the extracted standard authorizer information, the authorizer information shown in FIGS. 8A and 8B is generated in the RAM 53. While in this embodiment the management information and the authorizer information are generated separately, associated with each other and stored, they may be generated in an integral structure.

Although in this embodiment the application information is generated first, followed by the generation of the management information, the present invention is not limited in terms of the order of generation and the application information may be generated after the management information has been prepared.

Next, based on the department number C1 and the application category C5, which are set in the management information generated in the RAM 53 as described above, the draft plan number is acquired from the application document management file 58. At the same time, the application information is registered in the application document management file 58. This draft plan number is set, by the application subsystem, into the draft plan number C2 of the management information corresponding to the application information, the draft plan number D2 of the application information, and the draft plan number R10 of the authorizer information (step G17). With these draft plan numbers, the management information, the application information and the authorizer information are associated with each other.

Then, according to the route change request information stored in the RAM 53, a check is made to see whether an authorizer information change is specified (step G18). If it is decided that a change is specified, the authorizer information change screen is displayed on the display device 55 of the client 11 and, based on the information entered by the applicant, the personal information R20 making up the authorizer information stored in the RAM 53 is changed (step G19). This processing enables quick changes in the authorizer information whenever a personnel change occurs, preventing delays of decision on the application document due to changes of the authorizers. When, on the other hand, the above check decides that no change is specified, the processing moves to step G20.

In this embodiment, the management information and the application information are each divided and placed in an application document file, an application content file, and an authorizer information file at time of application for approval. In that case, three new files are generated first. Next, the management information, the application information and the authorizer information stored in the RAM 53 are copied into the application document file, the application content file and the authorizer information file. Then, these files are stored in the predetermined storage locations of the database 30 (step G20).

While in this embodiment, the management information, the application information and the authorizer information are generated temporarily in the RAM 53 and then copied into files at time of application, they may be generated and stored directly in these files without being stored in the RAM 53. However, when the management information, the application information and the authorizer information are generated directly as the files, the number of accesses to the files increases, making the time it takes to generate each file longer than when the RAM 53 is used for file generation. Hence, it is desired to generate files by using the RAM 53.

Further, the management information and the application information are each divided into the application document file and the application content file and stored in the database 30 because this arrangement allows the application information to be handled efficiently by the decision making subsystem. Depending on the configuration of the system, the application document file and the application content file may be handled as a single file. Therefore, the file structure may take various different forms according to the processing arrangement of the system.

As can be seen from the above, because a series of steps from G10 to G15 generates the application document described in the appended claims, these steps function as an application document generating means. If the decision making transaction is replaced with the document management, the steps from G10 to G15 in the appended claims function as a document generating means. The step G16 is a management information generating means for generating the management information used to manage the application documents. Steps G17 to G20 relate the management information and the application information and store them in the RAM 53, and thus function as a storage means described in the appended claims. While in this embodiment we have explained a case where only one application document generating means is provided for simplicity of explanation, it is possible to use the application document generating means for each kind of application document. This can be easily realized by using the management information generating means.

Figure 10:
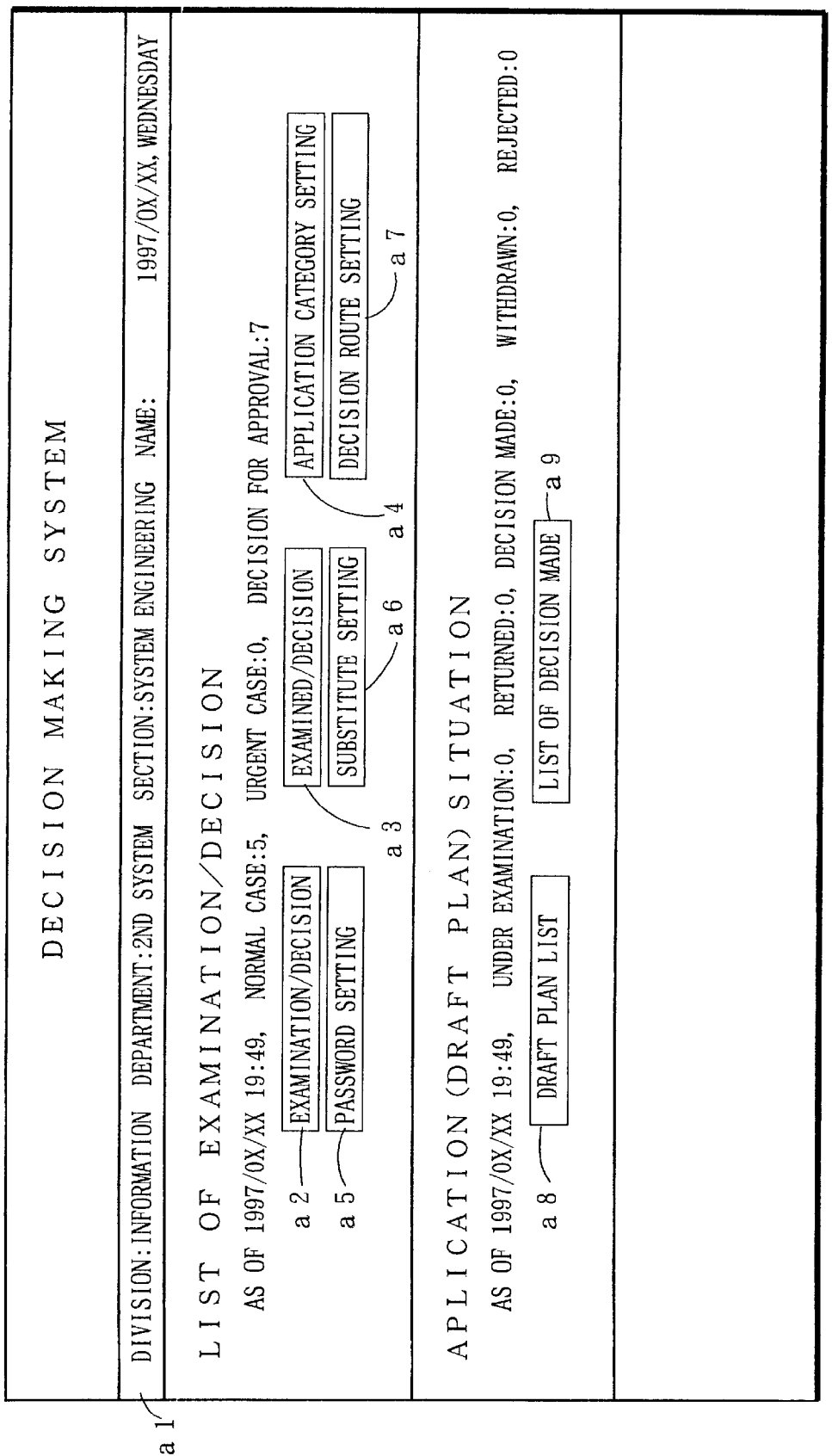
FIG. 10 illustrates a menu screen for the decision making system.

Next, the display screen for the decision making subsystem will be described. FIG. 10 illustrates a menu screen for the decision making system. This menu screen is prepared in advance by the decision making system and is displayed when an examiner or authorizer starts the decision making system via his or her client terminal.

In FIG. 10, a1 represents a user information display area that shows user information such as the name of a user and department to which the user belongs. A field a2 represents an examination/decision button which, when selected by an examiner or authorizer, starts the decision making subsystem to display a list of application information relating to the user, such as shown on the examination/decision list display screen in FIG. 11. According to the category of the displayed application information, the examination or decision making transaction can be performed. A field a3 indicates an examination/decision-finished button which, when selected, allows one to reference a list of application information that has undergone the decision making procedure. A field a4 represents an application category setting button which, when selected, allows one to add or change an application category.

A field a5 represents a password setting button which allows one to change or add a password of examiner or authorizer. A field a6 represents a substitute setting button which, when selected, allows one to designate a substitute person who will perform the decision making procedure on behalf of the user while he is away, and also to specify a period during which the substitute person will do the job.

When the substitute setting button a6 is selected, a substitute selection screen is displayed. The user selects a substitute person according to this screen. The decision making subsystem, based on the selected information, acquires the staff number of the substitute person and stores it in the RAM 53. Next, based on the user information, the system searches for the personal information R20 relating to the user and sets the staff number of the substitute person stored in the RAM 53 into the substitute staff number R26 of the corresponding personal information R20.

When a check is made as to the authorizer in charge of the application information based on the personal information R20 of the authorizer information and a staff number is set in the substitute staff number R26 of the personal information R20, the substitute person is regarded as the authorizer of the personal information R20. Thus, when the authorizer is away on his business trip, a switch can swiftly be made from the original authorizer to the designated substitute person, preventing a delay in the decision on the application document which would otherwise be caused by the absence of the authorizer.

A field a7 is a decision making route setting button which, when selected, allows the user to add or change the authorizer information. When authorizer information is added because of the addition of an application category via the application category setting button a4, authorizer information corresponding to the application category can be newly generated or referenced. When making a change or addition to the authorizer information, the change or addition can be made to the authorizer information displayed according to the application category specification.

A field a8 is a draft plan list button which, when selected, generates a list display data based on the management information corresponding to the application information accepted in the database 30 and displays a list of application information according to the list display data. By selecting desired application information from the displayed list, a list of examination/decision situation for the application information is displayed as shown in FIG. 13.

A field a9 represents a decision-finished list button which, when selected, generates a list display data for application information that has undergone decision making procedure according to the date of decision C10 and state of decision C11 of the management information stored in the database 30. From the list display data thus displayed a list of decision-finished application information is displayed.

FIG. 11 illustrates an examination/decision list display screen. This screen is used to show a list of associated application information to the user and is displayed by the decision making subsystem. In FIG. 11, a field b1 represents a password input field into which the user enters a predetermined password when he or she approves the application information. The application subsystem identifies the user based on the matching between the password entered in the password input field b1 and the predetermined password. A field b2 is a return button which is used to end the examination/decision procedure. Selecting the return button b2 by the user terminates the decision making subsystem.

A field b3 is an examination/decision button which is used by the user to make a decision on the application information. The examination/decision button b3 is paired with the password entered in the password input field b1. This arrangement can prevent unauthorized persons from making a decision. A field b4 is a send-back button which, when selected by the authorizer, sends the application information back. A field b5 is a reject button which, when selected by the authorizer, rejects the application information.

A field b10 represents an application document list which shows a list of application information of which the user is in charge. The application document list b10 includes items ranging from b11 to b18 and data corresponding to these items are displayed for each application information. A field b11 is a check box. The user can approve the checked application information by checking the check box b11, entering his or her password into the password input field b1 and selecting the examination/decision button b3.

The check box b11 is displayed according to the decision state of the application information and, when it is not the user's turn, the check box b1 is not displayed. The decision state of the application information is determined by the state of decision C11 of the management information and the decision control level information R24 of the personal information R20 in the authorizer information associated with the user. Because the order of decision making by the authorizers contained by the authorizer information is controlled based on the decision state information, the application document can be processed by the decision making procedure in the predetermined order of the authorizer.

A field b12 indicates a priority level, which is either "normal" or "urgent" depending on the information set in the priority level C6 of the management information. A field 13 represents a control level, which displays what is set in the decision control level information R24 of the personal information R20 that represents the control level in processing the application information, i.e., either "examination" or "decision." A field b14 represents an examination/decision item which displays information set in the decision item C8 of the management information. When the check box b11 for the application information is displayed, the characters displayed in the examination/decision item b14 is underlined. Double-clicking this underlined character information with a mouse causes the content of the application information of FIG. 11 described later to be displayed on the display device 55.

A field b15 is an application category, which displays the information set in the application category C5 of the management information. A field b16 is a date of application, which displays the information set in the application date C4 of the management information. A field b17 is an applicant, which displays the name of an applicant according to the data of staff number C3 of the management information.

A field b18 is a remark, in which a word "reference data" appears when there is reference data associated with the application information. Because the supplementary information for the application document is indicated, the authorizer can know the presence or absence of the supplementary information. When the user double-clicks the "reference data" with a mouse, the reference data is retrieved according to the reference data information set in the reference data C9 of the management information associated with the application information and the application program that has generated the reference data is started to display the reference data. However, when the corresponding application is not installed in the terminal, the reference data is not displayed.

FIG. 12 shows a screen showing the content of the application document of a credit line draft plan. This display screen is used by an examiner or authorizer for referencing the application information. When the examiner or authorizer selects the application information based on the examination/decision list screen of FIG. 11, the application content data D4 of the application information associated with the management information corresponding to this selection is retrieved. Then, the application content data (application document) is displayed by the display means in a format defined by the instruction data contained in the application content data D4.

In FIG. 12, an area E represents an approval common section including C1 to C8 which is common to all transactions with different input screen. An area F represents an application content display section, which displays data as it is set in the application content data D4 of the application information generated by the application subsystem. The application content display section F of FIG. 12 corresponds to the display screen of FIG. 7 with the "credit line draft plan (for reference)" inserted in the input screen variable section D. Therefore, when the decision making transaction differs, the display content in the application content display section F will change.

A field C1 represents a password input field, which is set with a predetermined password when the user approves the application information. A field C2 is a comment input field, in which the user enters his comment on the application information. A field C3 is an examination/decision button, which is used by the user to approve the application information. The examination/decision button b3 is used in combination with the password entered in the password input field b1. A field C4 is a send-back button which, when selected, sends the application information back.

A field C5 is a reject button which, when selected, rejects the application information. A field C6 is a comment add button which, when selected, adds a comment to the result of decision on the application information when a comment is entered into the comment input field C2. To erase the comment requires erasing the comment in the comment input field C2 and selecting the reject button C5. A field C7 is a clear button which is used to delete data in the password C1 and comment input field C2. A field C8 is a return button which is used when the user ends the screen input.

FIG. 13 shows an examination/decision situation list screen for the application information of FIG. 12. This screen is displayed according to the decision situation confirmation information from the applicant, examiner, authorizer and a user who is authorized to reference the application information. Hence, according to the decision situation on the application information, the authorizer can confirm the situation of the decisions on the application documents of which he is in charge.

In FIG. 13, a field d1 represents a department number, d2 a draft plan number, d3 an application date, d4 an application category, d5 a priority level, d6 an applicant, d7 a holding of prior consultation, and d8 a decision item. These display information correspond to information set in the items of the management information related to the specified application information, i.e., the department number C1, draft plan number C2, application date C4, application category C5, priority level C6, prior consultation information C7 and decision item C8. The information set in these items are displayed in respective display information.

A field d10 is a list of authorizers, the number of which equals in number to that of the personal information R20 that make up the authorizer information related to the management information of the designated application information. The authorizer list d10 includes items d11 to d16 which display corresponding data for each personal information R20.

A field d11 represents an examiner/authorizer item that displays information set in the name information R22 of the personal information R20. A field d12 is a substitute item which displays the name information according to the substitute staff number R26 only when the information is set in the substitute staff number R26 of the personal information R20. A field d13 is a transaction date item which displays date information set in the transaction date R25 of the personal information R20. A field d14 is a decision control level item which displays information set in the decision control level information R24 of the personal information R20. A field d15 is a comment item which displays a comment on the application information made at time of examination/decision.

Next, by referring to a flow chart of examination/decision making procedure in the decision making subsystem of FIG. 14, the examination/decision making procedure will be explained. This flow chart represents the steps W20 and W23 in the workflow of the decision making system. It is assumed that the RAM 53 resides in the terminal of the server 10

An examiner becomes aware that he has received application information, by means of the menu screen of the decision making system of FIG. 10 displayed on the display device at the client 12. The examiner selects the examination/decision button a2 to start the decision making subsystem, which retrieves the user information, such as department, name, staff number and password, and stores them in the RAM 53 (step S1).

With the retrieved user information as a key, the personal information R20 of the authorizer information stored in the database 30 is searched to pick up the management information of the application information under the charge of the user. Based on the management information thus extracted, the list display data showing a list of application information for the user is generated and stored in the RAM 53 (step S2). Then, the list display data stored in the RAM 53 is displayed as the application document list b10 on the examination/decision list screen of FIG. 11 (step S3). At the same time when a transaction request from the examination/decision list screen is detected, the necessary processing is allocated according to the request (step S5).

When the examination/decision button b3 is selected, the subsystem moves to approval processing at step S6. The approval processing checks the password entered. When the password is correct, the state of decision C11 of the management information is set according to the authorizer information. In more detail, when the decision control level information R24 of the authorizer information is "final examination," the state of decision C11 is set with "decision," indicating that the examination steps have been completed.

When the decision control level information R24 is "decision," the state of decision C11 is set with "approval," indicating that the application information has been approved. Further, the transaction date R25 of the personal information R20 of the authorizer information associated with the management information is set with the date information retrieved from the terminal and the confirmation information 27 is set with "confirmed." Then, the examination/decision list screen is erased (step S10) and the decision making subsystem is terminated, causing the system to return to the menu screen of FIG. 10. When the password entered is illegal, the user is prompted to enter the password again.

When the send-back button b4 is selected, the subsystem proceeds to the send-back processing at step S7. The send-back processing sends the result of decision, i.e., the send-back decision, to the applicant and erases the examination/decision list screen (step S10), terminating the decision making subsystem and returning the subsystem to the menu screen of FIG. 10. At this time, the state of decision C11 of the management information associated with the application information is set with "send-back," indicating that the application information has been sent back. Further, the transaction date R25 of the personal information R20 of the authorizer information associated with the management information is set with the date information retrieved from the terminal, and the confirmation information 27 is set with "confirmed."

When the reject button b5 is selected, the subsystem moves to the reject processing at step S8 where it sends the decision result, i.e., the reject decision, to the applicant, erasing the examination/decision list screen (step S10), terminating the decision making subsystem and returning the system to the menu screen of FIG. 10. At this time, the state of decision C11 of the management information associated with the application information is set with "rejected," indicating that the application information has been rejected. Further, the transaction date R25 of the personal information R20 of the authorizer information associated with the management information is set with the date information retrieved from the terminal, and the confirmation information 27 is set with "confirmed."

When the return button b2 is selected, the examination/decision list screen is erased (step S10) and the decision making subsystem is terminated, returning the system to the menu screen of FIG. 10.

When the examination/decision item b14 of the application document list b10 is selected, the subsystem proceeds to the application content display processing at step S9. In the following, the application content display processing will be explained by referring to a flow chart of the application content display processing of FIG. 15.

Figure 15:
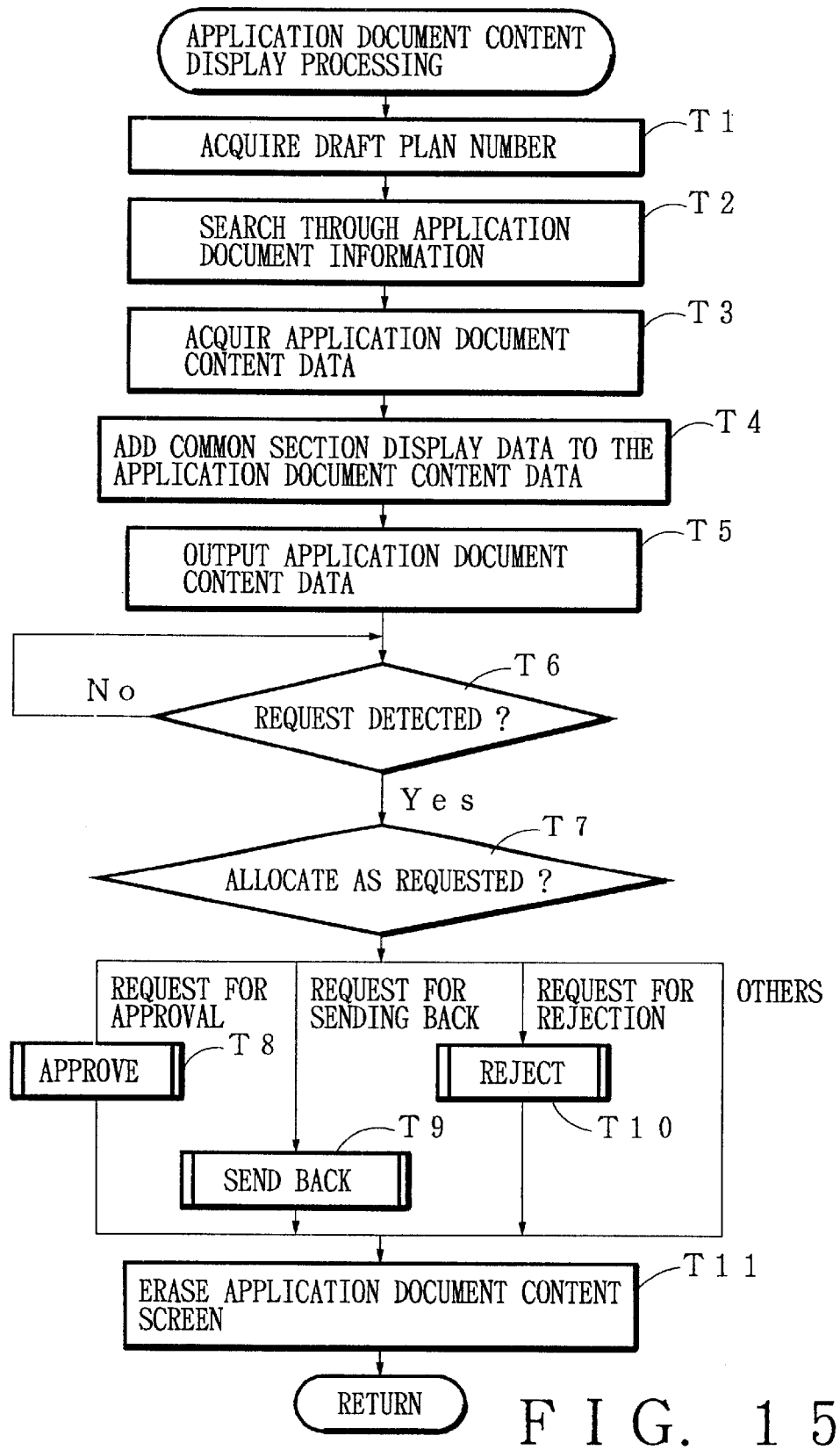
FIG. 15 is a flow chart for application content display processing performed by the decision making subsystem.
Figure 17:
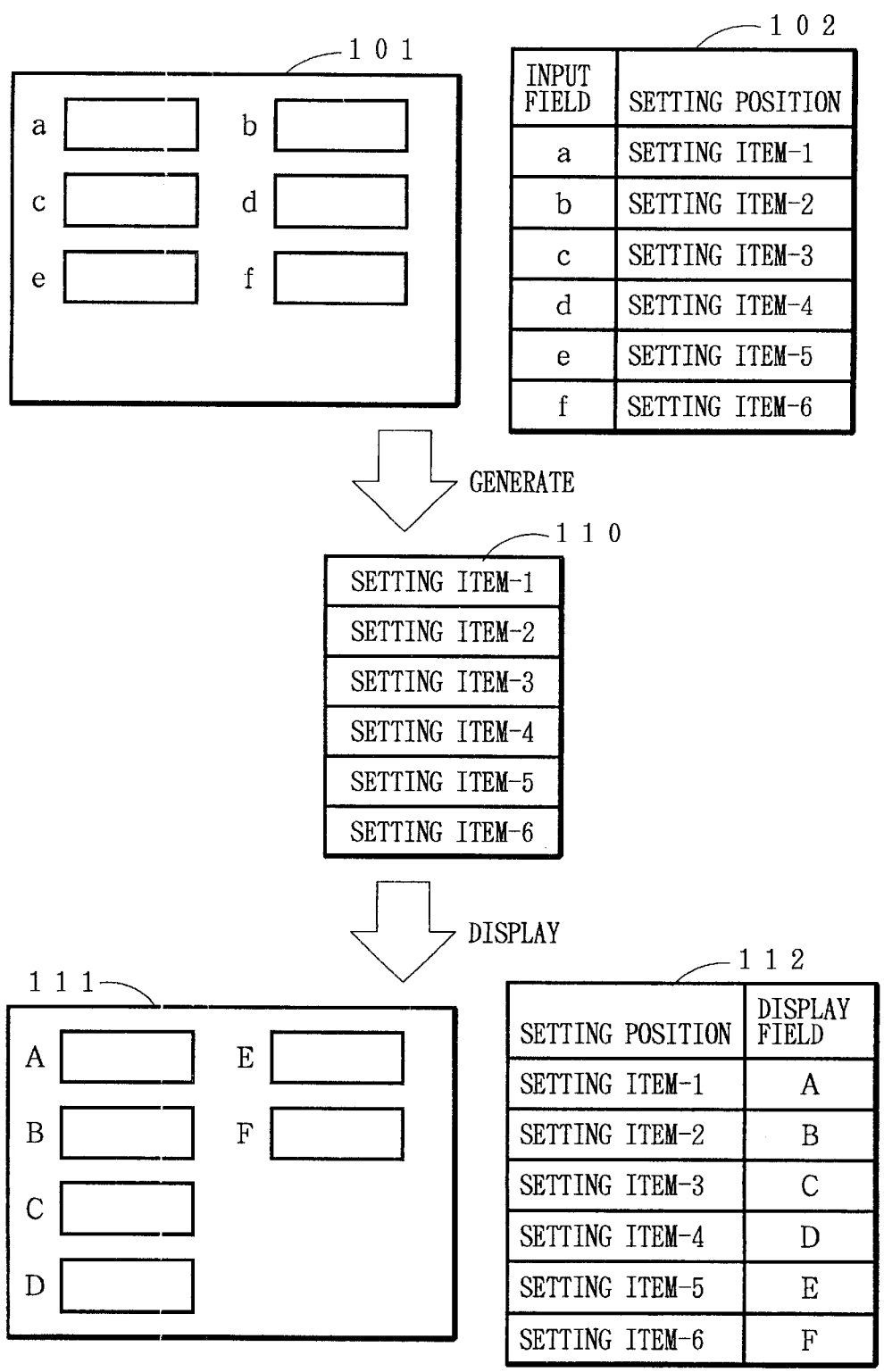
FIG. 17 illustrates an example of on-screen data commonly shared in a conventional system.

In FIG. 15, a draft plan number set in the draft plan number C2 of the management information associated with the designated application information is retrieved and stored in the RAM 53 (step T1). With the draft plan number as a key, the application information stored in the database 30 is searched through to pick up the application information having this draft plan number (step T2). The application content data D4 contained in the application information thus picked up is temporarily stored in the RAM 53 (step T3).

Approval common section display data having an instruction code prepared to display the approval common section E of FIG. 12, which is used by the authorizer to approve the decision-finished document information, is added to the stored application content data D4, starting from a predetermined position. The application content data with the added approval common section display data is stored in the RAM 53 (step T4). In this embodiment, as shown in the display screen of FIG. 12, because the approval common section E is displayed above the application content display section F representing the application content data D4, the predetermined position is at the head of the application content data.

It should be noted that the position from which the common section display data is added differs depending on the layout of the display screen. Although the application content data may be generated by the application subsystem by adding the approval common section display data, this has a problem that the decision making subsystem cannot make changes to the approval common section. In the arrangement that does not display the approval common section E, there is no need to add the display data to the application content data, so that the process of generating the application content data can be given a degree of freedom.

The application content data stored in the RAM 53 is output to the display means prepared in advance (step T5). In more detail, the application content data thus output is displayed by the display means on the display device 55 at the client 12 in a display format defined by the instruction data. While the application information is displayed, monitoring is performed until a processing request from the application content display screen is detected (step T6).

When a processing request from the application content display screen is detected, the necessary processing is allocated according to the request (step T7). When the examination/decision button c3 is selected, the subsystem proceeds to approval processing at step T8. The approval processing checks whether the password entered is correct. When it is found correct, the state of decision C11 of the management information is changed according to the authorizer information. Then, the application content display screen is erased (step T11), returning the system from the application content display processing to the examination/decision list display screen. The state of decision C11 of the management information associated with the application information is set with "approval," indicating that the application information has been approved. Further, the transaction date R25 of the personal information R20 of the authorizer information associated with the management information is set with the date information retrieved from the terminal, and the confirmation information 27 is set with "confirmed."

When the send-back button c4 is selected, the subsystem proceeds to the send-back processing at step T9. The send-back processing sends the result of decision, i.e., the send-back decision, to the applicant and erases the examination/decision list display screen (step T11), returning the subsystem from the application content display processing to the examination/decision list display screen. At this time, the state of decision C11 of the management information associated with the application information is set with "send-back," indicating that the application information has been sent back. Further, the transaction date R25 of the personal information R20 of the authorizer information associated with the management information is set with the date information retrieved from the terminal, and the confirmation information 27 is set with "confirmed."

When the reject button c5 is selected, the subsystem moves to the reject processing at step T10 where it sends the decision result, i.e., the reject decision, to the applicant, erasing the application content display screen (step T11), returning the system from the application content display processing to the examination/decision list display screen. At this time, the state of decision C11 of the management information associated with the application information is set with "rejected," indicating that the application information has been rejected. Further, the transaction date R25 of the personal information R20 of the authorizer information associated with the management information is set with the date information retrieved from the terminal, and the confirmation information 27 is set with "confirmed."

When the return button c8 is selected, the application content display screen is erased (step T11), returning the system from the application content display processing to the examination/decision list display screen. When the system returns from the application content display processing to the decision making processing, it goes to the examination/decision list screen display processing at step S3 where it waits for the next processing request from the user and performs processing according to the result of check on the request at the step S5.

A series of steps performed by the decision making subsystem as described above is similarly executed also by an authorizer. The authorizer starts the decision making subsystem from the client 13, a terminal of the authorizer, to execute processing in the same way as the examiner. Upon completion of the decision making procedure on the part of the authorizer, the whole decision making process is finished.

In this way, when the examiner and authorizer check the content of the application information, a display means prepared in advance displays the content in a display format as defined by instruction data contained in the application content data. Hence, there is no need to provide, on the decision making (display) side that manages the application document, a display means that is based on the data structure of the application document. What needs to be provided is only a display means which displays the application document in a display format as defined by instruction data contained in the application document. Therefore, even when changes or modifications occur in the data structure of the application document on the application (generation) side, it is possible to prevent similar modifications from occurring on the decision making (display) side.

Figure 14:
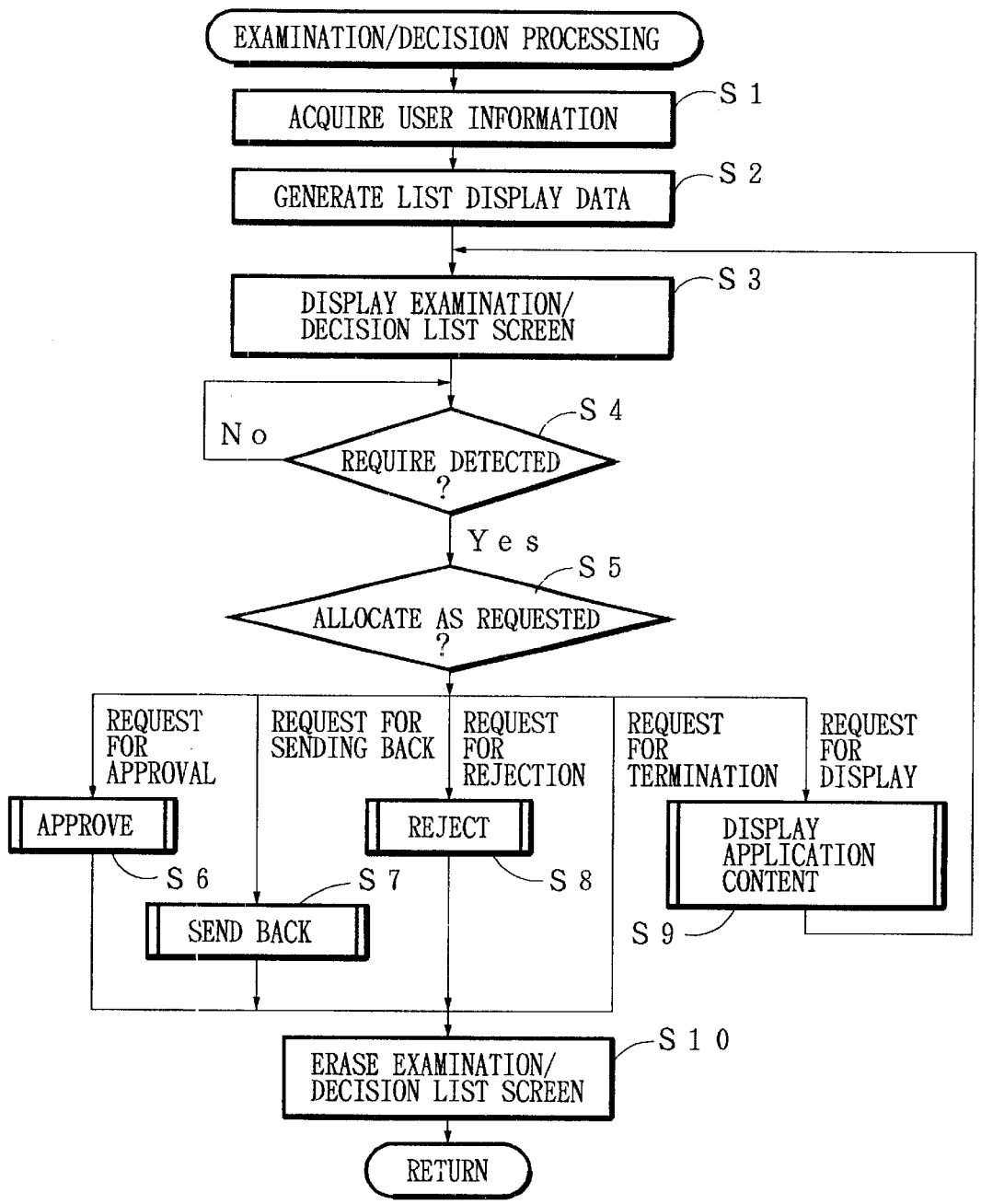
FIG. 14 is a flow chart for examination/decision transaction performed by the decision making subsystem.

In the above-described embodiment, steps S1–S5 in the examination/decision processing in FIG. 14 and the application content display processing at step S9 combine to perform the display control of application document, and these steps function as an application document display control means. If the decision making transaction is replaced with the document management, the application document display control means constitute the document display control means in the appended claims.

In the above embodiment, because application content data (application document) is generated in HTML (hypertext markup language) format, the instruction data in the application content data corresponds to a tag or reservation word disposed between "<" and ">". A browser is used as the display means for displaying the content in a display format as specified by the instruction data. The HTML is a programming language to write documents making up home pages used in the WWW (World Wide Web). The browser is software to view home pages in the Internet and its function to display in a format as specified by an HTML tag is a publicly known technology. While in this embodiment the application document is generated in the HTML format, the present invention is not limited to this display format and may use other formats, such as XML (extensible markup language) and SGML (standard generalized markup language), in generating application documents.

Example known browsers include "Internet Explorer" of Microsoft and "Netscape Navigator" of Netscape Communications. The browser has a function to enable computers to be operational on networks by TCP/IP and a function to enable the use of the capability of the networks through network computers. These functions can be utilized by the use of the browser.

Hence, in this embodiment, by providing in advance a browser as a display means in an executable state in each client terminal and server terminal shown in FIG. 2 and by outputting the application content data of the application information generated in HTML format to the browser, it is possible to display the content of the application information easily. Further, displaying all screens in the decision making system including the application subsystem and the decision making subsystem is carried out by the browser. That is, the decision making system is executed on the browser, so that the screen display of information generated in the HTML format as well as the processing among terminals in a network can be performed easily.

By using the present invention in the decision making system, it is possible to easily add a new supplier draft plan as a new transaction to the decision making system. To this end, a new application subsystem is first prepared for the transaction of the new supplier draft plan and a new application category is added. Then, the processing on the decision making subsystem side is modified to match the application category of the application subsystem. An input screen shown in FIG. 16 may be used as an input screen for the new supplier draft.

Comparison between the input screens of application information in FIGS. 12 and 16 shows that the input screen common sections C are equal, with only the input screen variable sections D differing in structure and layout. Giving a degree of freedom to the structure and layout of the input screen variable section D makes it possible to deal with different transactions that perform processing based on a workflow similar to that of the decision making system. This obviates the need to modify or newly generate the screen display of the decision making subsystem even when modifications or additions are made to the application subsystem.

The functions of the decision making system described in this embodiment, such as the function to display an examination/decision state list for the purpose of confirming the decisions on the application information, the function to change the authorizer for the application information and the function to designate a substitute person for the authorizer, are not limited to the decision making system of this invention but can also be applied to the conventional decision making system.

While this embodiment concerns a case where the document management is applied to the decision making system, the present invention is also applicable to other transactions than decision making. For example, the invention is suited for the workflow management system dealing with such transactions as requires circulation of documents, which include order taking and notification, price change, overtime application, trip application, settlement of traffic expenses, and holiday application.

Although in the above embodiment the application subsystem has an application information generating means and a document generating means, both described in the appended claims, the invention is not limited to this configuration. The application subsystem may have only the application information generating means, and at the same time a new application document generating subsystem having the application document generating means may be provided.

While the above embodiment has described a case where the invention is applied to the decision making system, the similar effects of the decision making system can also be obtained by the following document management apparatus. That is, the application document in the decision making system is replaced with a document which is produced on the document generation side by combining transaction data and instruction data. This document is connected with management information generated by the management information generating means and then stored in a storage means. Based on the management information stored in the storage means, a display control means selects and displays one of a plurality of documents in a display format as specified by the instruction data contained in this document.

Further, in the decision making transactions dealing with a plurality of kinds of application information, the structure of the management information may be made common to all kinds of documents and the document content data provided with flexibility. This can reduce the number of development processes and the amount of work needed to add and expand transactions, thus improving development efficiency.

In the management of documents of non-regular form without a common section, too, the invention enables the display means to be used commonly by combining the document with the instruction data that defines a display format in which the document is displayed. This can reduce the number of development processes and the amount of work during development, and therefore achieve improved development efficiency.

What is claimed is:

1. A document management apparatus for managing a plurality of documents each of which has a combination of transaction data and instruction data, the transaction data including variable data entered during the course of a transaction and fixed data for the transaction, the instruction data defining a display format for the transaction data; the document management apparatus comprising:

a management information generating means for generating management information associated with each of the plurality of documents;

a storage means for storing the associated plurality of documents with the management information; and a display control means for generating a display of the plurality of documents based on the management information stored in the storage means, and for displaying a selected one of the documents in a display format as defined by the instruction data contained in that document.

2. A document management apparatus according to claim 1, further comprising a document generating means which, in response to a request for generating the document, displays the document into which the variable data can be entered, and combines the variable data entered from the display with the document to generate the document.

3. A document management method for managing a plurality of documents each of which has a combination of transaction data and instruction data, the transaction data including variable data entered during the course of a transaction and fixed data for the transaction, the instruction data defining a display format for the transaction data; the document management method comprising the steps of:

generating management information associated with each of the plurality of documents;

correlating the plurality of documents with the generated management information;

storing the correlated documents and management information; and generating a display based on the stored management information;

selecting one of the documents displayed; and generating a display of the document selected in a display format as defined by the instruction data contained in that document.

4. A document management method according to claim 3, comprising the further step of:

in response to a request for generating the document, displaying the document into which the variable data can be entered, and combining the variable data entered from the display with the document to generate the document.

5. A computer-readable recording medium storing a program for causing a computer to manage a plurality of documents, each of which has a combination of transaction data and instruction data, the transaction data including variable data entered during the course of a transaction and fixed data for the transaction, the instruction data defining a display format for the transaction data; the computer-readable recording medium storing a document management program for causing the computer to execute the steps of:

generating management information associated with each of the plurality of documents;

correlating the plurality of documents with the generated management information;

storing the correlated documents and management information; and generating a display based on the stored management information;

selecting one of the documents; and generating a display of the document selected in a display format as defined by the instruction data contained in that document.

6. A computer-readable recording medium according to claim 5, which stores a document management program for causing the computer to execute the step of:

in response to a request for generating the document, displaying the document into which the variable data can be entered, and combining the variable data entered from the display with the document to generate the document.

7. A computer-readable recording medium storing a decision making program for causing a computer to manage a plurality of application documents and to display the application documents so as to make decisions on the application documents under management, each of the application documents having application data and instruction data, the application data including variable data entered during the course of a decision making transaction and fixed data for the decision making transaction, the instruction data defining a display format for the application data; the computer-readable recording medium storing a decision making program for causing the computer to execute the steps of:

generating management information associated with each of the plurality of application documents;

correlating the plurality of application documents with the generated management information;

storing the correlated application documents and management information;

generating application document list display data for displaying an application document list based on the stored management information;

selecting one of the plurality of application documents;

generating a display based on the application document list display data; and generating a display of the application document selected in a display format as defined by the instruction data contained in that application document.

8. A computer-readable recording medium according to claim 7, which stores a decision making program for causing the computer to execute the step of:

in response to a request for generating the application document, displaying the application document into which the variable data can be entered, and combining the variable data entered from the display with the document to generate the document.

9. A computer-readable recording medium according to claim 7 or 8, which stores a decision making program for causing the computer to execute the steps of:

relating supplementary information to the management information, the supplementary information being attached to the application document to supplement the content of the application document; and making a display for selecting the supplementary information when the presence of the supplementary information for the application document is recognized based on the management information.

10. A computer-readable recording medium according to claim 7 or 8, which stores a decision making program for causing the computer to execute the steps of:

when generating the management information having a plurality of management items, retrieving as one of the management items an application category for classifying the decision on the application document;

retrieving authorizer information for the application document from authorizer information prepared in advance that defines authorizers for each of the application categories;

in response to a request from the authorizer, detecting the management information corresponding to the authorizer based on the retrieved authorizer information; and generating the application document list display data for displaying the application document list based on the detected management information.

11. A computer-readable recording medium according to claim 7 or 8, which stores a decision making program for causing the computer to execute the step of:

when generating the application document list display data for displaying the application document list in response to the request from the authorizer, controlling an order of decision making by the authorizers defined in the authorizer information according to decision order information and decision state information, the decision order information having an order of the authorizers preset in the retrieved authorizer information, the decision state information having a decision state set according to the progress of decision making on the application document.

12. A computer-readable recording medium according to claim 10, which stores a decision making program for causing the computer to execute the step of:

inputting decision state confirmation information to confirm the progress of decision making on the application document;

retrieving the management information according to the decision state confirmation information entered;

generating decision state display data representing the progress of decision making on the application document based on the management items of the retrieved management information and on the authorizer information; and displaying decision state of the application document based on the decision state display data.

13. A computer-readable recording medium according to claim 10, which stores a decision making program for causing the computer to execute the step of:

inputting change request information for changing the authorizer; and changing the authorizer information according to the change request information entered.

14. A computer-readable recording medium according to claim 10, which stores a decision making program for causing the computer to execute the step of:

inputting substitute designation information for designating the authorizer and a substitute person who will perform the decision making on behalf of the authorizer;

detecting the authorizer information associated with the authorizer according to the substitute designation information entered; and relating the detected authorizer information with substitute information associated with the substitute person designated by the substitute designation information.

* * * * *